(12) United States Patent
Horie et al.

(10) Patent No.: US 6,735,341 B1
(45) Date of Patent: May 11, 2004

(54) IMAGE PROCESSING DEVICE AND METHOD AND RECORDING MEDIUM FOR RECORDING IMAGE PROCESSING PROGRAM FOR SAME

(75) Inventors: Daisaku Horie, Itami (JP); Manji Takano, Amagasaki (JP); Kentaro Iida, Amagasaki (JP); Kimiharu Akahoshi, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/325,356

(22) Filed: Jun. 4, 1999

(30) Foreign Application Priority Data

Jun. 18, 1998 (JP) .......................................... 10-171772
Jun. 18, 1998 (JP) .......................................... 10-171773
Jun. 18, 1998 (JP) .......................................... 10-171774
Jun. 18, 1998 (JP) .......................................... 10-171775
Jun. 18, 1998 (JP) .......................................... 10-171776

(51) Int. Cl.$^7$ ................................................. G06K 9/36
(52) U.S. Cl. ........................ 382/239; 358/461; 382/254
(58) Field of Search ................................. 382/232, 234, 382/243, 195, 173, 176, 205, 254, 282, 239; 358/467, 465, 462, 453, 461

(56) References Cited

U.S. PATENT DOCUMENTS

| | | | | |
|---|---|---|---|---|
| 5,696,842 A | * | 12/1997 | Shirasawa et al. | 382/176 |
| 5,771,340 A | * | 6/1998 | Nakazato et al. | 395/114 |
| 5,861,960 A | * | 1/1999 | Suzuki et al. | 382/239 |
| 5,991,458 A | * | 11/1999 | Kunitake et al. | 382/254 |
| 6,108,380 A | * | 8/2000 | Miyaji et al. | 348/412 |
| 6,268,935 B1 | * | 7/2001 | Kingetsu et al. | 358/2.1 |
| 6,339,616 B1 | * | 1/2002 | Kovalev | 348/699 |
| 6,389,169 B1 | * | 5/2002 | Stark et al. | 382/225 |

FOREIGN PATENT DOCUMENTS

| | | |
|---|---|---|
| JP | 7-288679 | 10/1995 |
| JP | 8-123958 | 5/1996 |

* cited by examiner

Primary Examiner—Yon J. Couso
(74) Attorney, Agent, or Firm—Burns, Doane, Swecker & Mathis, LLP

(57) ABSTRACT

An image processing device includes a first discriminator for discriminating halftone regions of an input image; and a device for smoothing only the discriminated halftone regions. An image processing device also includes a discriminator for discriminating the characteristics of a region for image compression of an image included in a corrected image; and a first device for modifying a degree of discrimination of a local area included in the region for image compression in accordance with the discriminated characteristics; and a second device for modifying a method of compression of the region for image compression in accordance with the discriminated characteristics. An image processing device includes a device for discriminating the characteristics of a region for image compression of an image included in a corrected image; and a first device for modifying a degree of correction of a local area included in the region for image compression in accordance with the discriminated characteristics; and a second device for modifying a method of compression of the region for image compression in accordance with the discriminated characteristics.

3 Claims, 30 Drawing Sheets

Macro Region Discrimination Result includes an image outside photograph → Low Compression Ratio

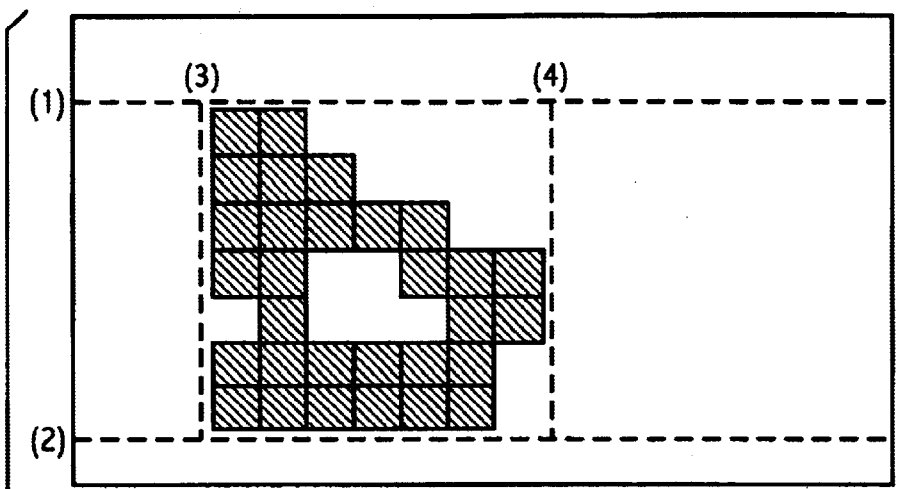

Circumscribed Square Extraction

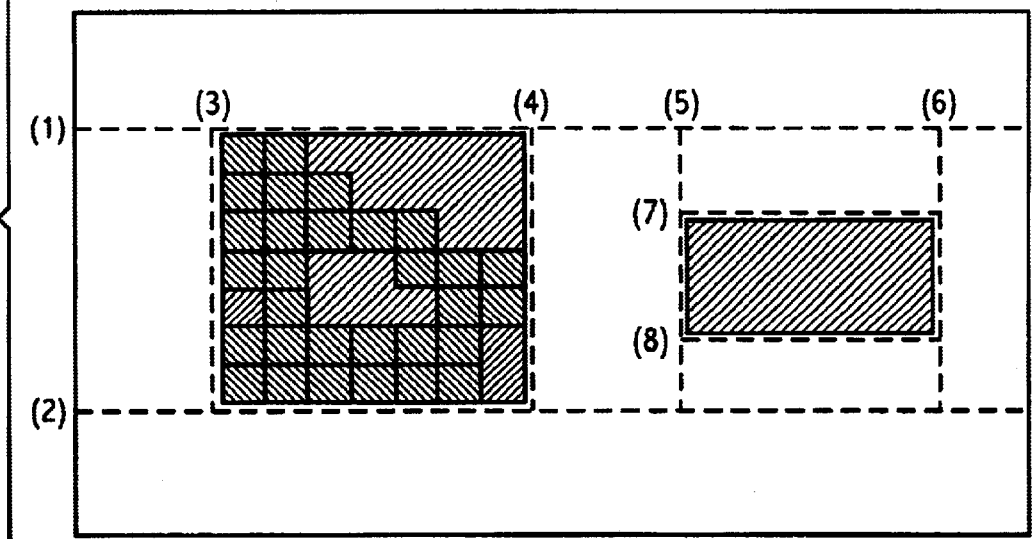

Circumscribed Square Extraction

 Photo/line Image Block

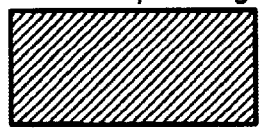 Extracted Square Region (1) Region Starting Line in 1st Vertical Scanning
(2) Region Ending Line in 1st Vertical Scanning
(3) Region Starting Line in 1st Horizontal Scanning
(4) Region Ending Line in 1st Horizontal Scanning
(5) Region Starting Line of 2nd Region in 1st Horizontal Scanning
(6) Region Ending Line of 2nd Region in 1st Horizontal Scanning
(7) Region Starting Line in 2nd Vertical Scanning
(8) Region Ending Line in 2nd Vertical Scanning

FIG. 16

Extraction of Edge Areas
Other Areas are Gradient Areas

Monochrome Region    Edge Region

| | Threshold Values for Local Area Discrimination | | Smoothing Filter in Edge Direction | Smoothing Filter in Gradient Process | Subtractive Coloration |
|---|---|---|---|---|---|
| | TH1 | TH2 | | | |
| Setting B (Case where macro region is line image region) | Increased | Decreased | Degree of smoothing is increased | Degree of smoothing is increased. (X is decreased) | Degree of subtractive coloration is increased |
| Setting B (Case where macro region is photographic region) | Decreased | Increased | Degree of smoothing is decreased | Degree of smoothing is decreased. (X is increased) | Degree of subtractive coloration is decreased |

FIG. 21

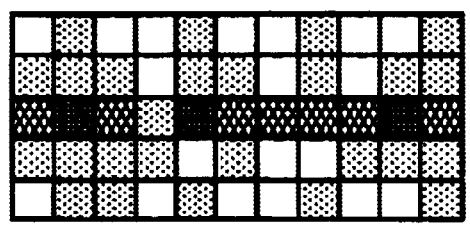
FIG. 32
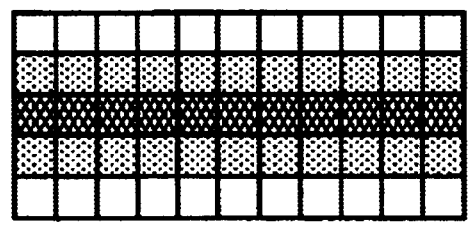
FIG. 33
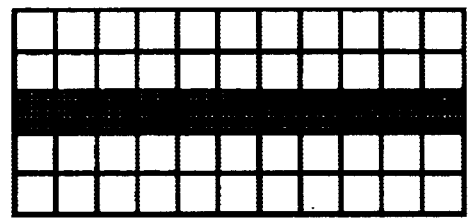
FIG. 34
| A | B | C |
|---|---|---|
| D | E | F |
| G | H | I |
FIG. 35

| 0 | 1 | 0 |
|---|---|---|
| 0 | 2 | 0 |
| 0 | 1 | 0 |

| 0 | 0 | 0 |
|---|---|---|
| 1 | 2 | 1 |
| 0 | 0 | 0 |

| 0 | 1 | 0 |
|---|---|---|
| 0 | 4 | 0 |
| 0 | 1 | 0 |

| 0 | 0 | 0 |
|---|---|---|
| 1 | 4 | 1 |
| 0 | 0 | 0 |

IMAGE PROCESSING DEVICE AND METHOD AND RECORDING MEDIUM FOR RECORDING IMAGE PROCESSING PROGRAM FOR SAME

BACKGROUND OF THE INVENTION

1. Field of the Invention

The present invention relates to an image processing device and method, and a recording medium for recording an image processing program for the same, and more specifically, the present invention relates to an image processing device and method for discriminating regions in input image data, compressing data of each region and subsequently outputting data, and a recording medium for recording an image processing program for the same.

2. Description of Related Art

Japanese Laid-Open Patent Application No. HEI 8-123958 discloses art for extracting regions from image data based on human perception, and reducing the amount of data while suppressing image quality deterioration by changing the color of part of the region or all of the region. Furthermore, image processing devices which compress a sensed image are well established.

OBJECTS AND SUMMARY

An object of the present invention is to improve the existing art by providing an image processing device and method capable of improving image quality and the compression rate of an image and to provide a recording medium for recording an image processing program for the same.

It is another object of the present invention to provide improved compression ratio and image quality in an image processing device which corrects image data, then compresses and outputs corrected image data.

These objects are attained, from the perspective of the present invention, by an image processing device comprising first discrimination means for discriminating a halftone region in an input image, and smoothing means for smoothing a discriminated halftone region.

It is desirable that the image processing device comprises second discrimination means for discriminating a monochrome region in an input image, and a monochromatization means for monochromatizing a discriminated monochrome region.

It is further desirable that the image processing device comprises compression means for compressing a smoothed and monochromatized region.

The image processing device, in accordance with other aspects of the present invention, comprises discrimination means for discriminating a monochrome region in an input image, and monochromatization means for monochromatizing a discriminated monochrome region.

The image processing method, in accordance with other aspects of the present invention, comprises a step of discriminating a halftone region in an input image, and a step of smoothing only the discriminated halftone regions. As used herein, a halftone region can include photographic regions and line image regions.

The image processing method, in accordance with other aspects of the present invention, comprises a step of discriminating a monochrome region in an input image, and step of monochromatizing a discriminated monochrome region.

According to one aspect of the present invention, input image data are divided into a plurality of local area blocks, and subjected to optimum correction in each block. When an area is a monochrome area, monochromatization (or subtractive coloration) process is executed, and when an area is a gradient area the gradient process (smoothing process) is executed based on the local area discrimination result. In this way the image compression ratio and image quality are improved because small noise and irregularities are eliminated from the image data.

A recording medium records an image processing program to be executed by a computer, in accordance with other aspects of the present invention. The program comprises a step of discriminating a halftone region in an input image, and a step of smoothing a discriminated halftone region.

The recording medium for recording an image processing program to be executed by a computer, in accordance with other aspects of the present invention. The program comprises a step of discriminating a monochrome region in an input image, and a step of monochromatizing a discriminated monochrome region.

The present invention is capable of improving the image compression ratio and image quality by smoothing halftone regions and monochromatizing monochrome regions.

That is, although image quality and compression ratio are reduced by high frequency areas arising from noise and halftone dots in printing, the present invention improves the image compression ratio and image quality by eliminating image irregularities and small isolated points.

BRIEF DESCRIPTION OF THE DRAWINGS

FIG. 5 is a flow chart showing processing when the document correction specification switch 7 is turned ON;

FIG. 16 illustrates the macro block squaring method;

FIG. 21 illustrates the relationship between parameter setting A and parameter setting B;

FIG. 32 shows image data as the subject of the edge process;

FIG. 33 shows the condition after smoothing the image data of FIG. 32;

FIG. 34 shows the condition after edge enhancement of the image data of FIG. 33;

FIG. 35 shows a filter used for the edge process;

FIG. 36 shows an example of a smoothing filter used in the line image region;

FIG. 37 shows an example of a smoothing filter used in a photographic region;

DETAILED DESCRIPTION OF THE PREFERRED EMBODIMENTS

Examples of a digital camera provided with the image processing device of an embodiment of the present invention is described below with reference to the accompanying drawings.

First Embodiment

Figure 1:
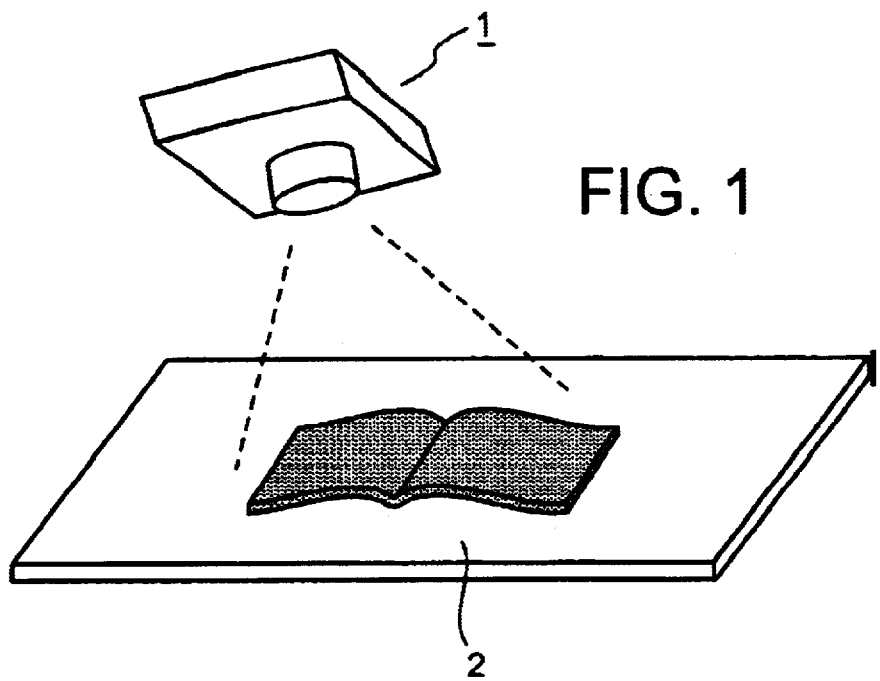
FIG. 1 shows the relationship between a photographic subject document 2 and a digital camera 1 of one embodiment of the present invention.

FIG. 1 shows a digital camera 1 photographing a text document 2 such as a magazine or the like. In the present embodiment, it is an object to compress an image at a high compression ratio while preserving data and attaining suitable transmission by restoring or estimating the original electronic data of a printed text document from a text document. At this time, noise included in the original electronic data is eliminated if necessary.

Figure 2:
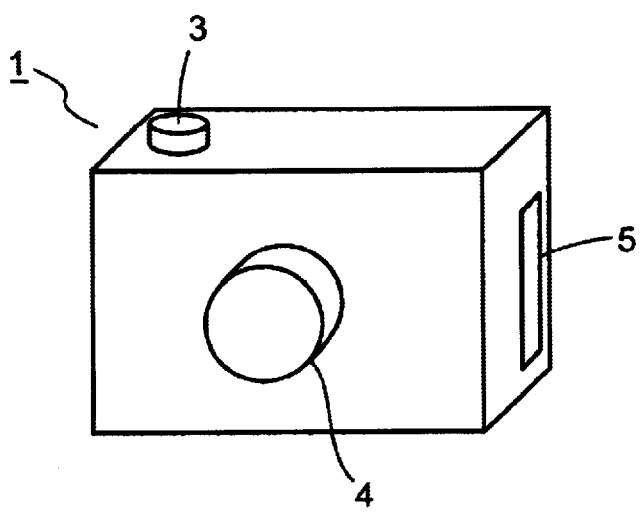
FIG. 2 shows digital camera 1 viewed from the lens side.
Figure 3:
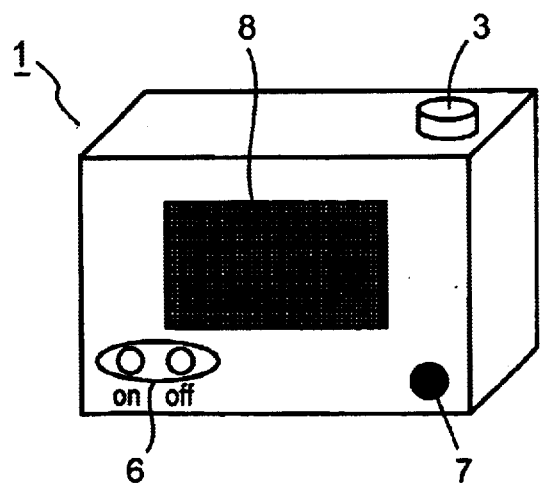
FIG. 3 shows digital camera 1 viewed from the display side.

FIG. 2 is a perspective view of the digital camera 1 from the front, and FIG. 3 is a view of the digital camera 1 from the back. The digital camera 1 comprises a shutter button 3, a photographic lens unit 4, a card insertion port 5, a power button 6, a document correction specification switch 7, and a viewfinder monitor 8 of liquid crystal or the like.

A photograph taken by the digital camera 1 is stored as electronic data on a hard disk storage card (not shown in the drawing) installed in the digital camera 1. This hard disk is an image data recording medium, for example, a PCMCIA type hard disk card, or, alternatively, a memory card may be used. A minidisk (MD) may also be used as the recording medium. The digital camera 1 also may be directly connected to a printer or the like via, for example, a SCSI cable.

In the digital camera 1 of the present embodiment, the image quality and compression ratio are improved by storing paper documents such as conference materials, catalogues, magazine, research materials and the like as electronic data.

The following disadvantages arise when photographing paper documents with a conventional digital camera:

Uneven exposure, color shift, and shading dependent on lighting conditions

Reduced dynamic range dependent on paper quality, lighting, and CCD characteristics Distortion dependent on the input system Reduced resolution dependent on the number of CCD pixels Swing and tilt and rotational dislocation arising from not limiting the position and type of document itself Unevenness and dots dependent on restrictions of resolution of the document itself When data is stored or transmitted, and when electronic data are compressed repeatedly due to compression ratio problems, the image quality deteriorates markedly due to the combination of the image characteristics and the compression method. In a conventional digital camera image quality problems are dependent on the selection of a compression method. Image quality and the compression ratio are also disadvantageously reduced by noise.

In the digital camera 1 of the present embodiment these disadvantages are eliminated by turning ON the document correction specification switch 7.

The digital camera 1 discriminates the attributes (characteristics) of each region included in an image, and executes correction processing and compression processing suitable for each attribute. Since a compression unit of an image is generally square, regions are generally discriminated in square macro region units (macro region discrimination). In order to execute optimum correction for each macro region, it is preferable to discriminate local areas within the macro region (local area discrimination). In this way, the compression ratio is increased, and the image quality is improved.

Figure 4:
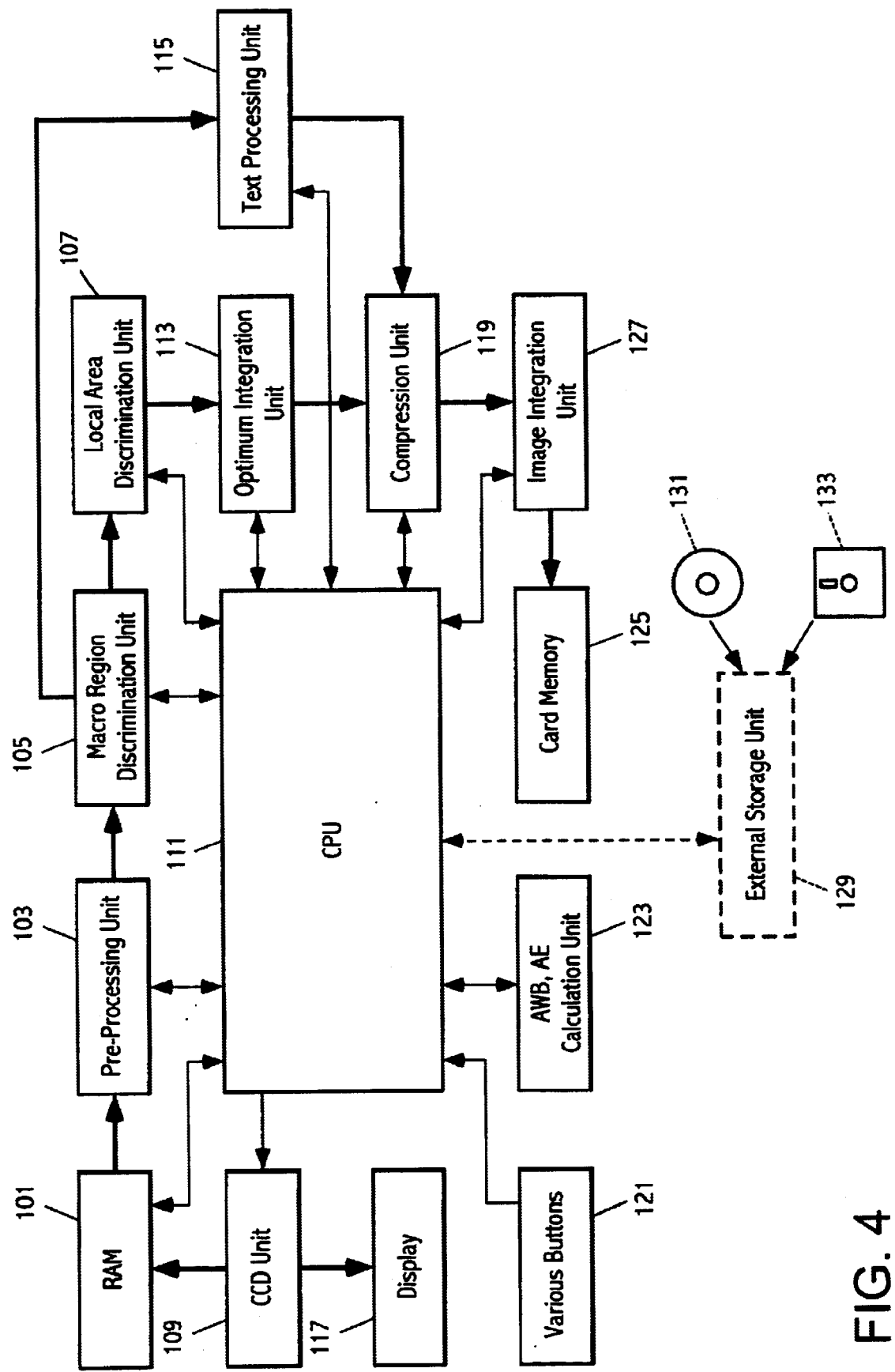
FIG. 4 is a block diagram showing the construction of digital camera 1.

FIG. 4 is a block diagram showing the circuit construction of the digital camera 1. The digital camera 1 includes a CPU 111 for controlling the entire digital camera 1, a CCD unit 109 for photography, a display 117 for displaying the photographic content (includes the viewfinder monitor 8), a RAM 101 for storing data received from the CCD unit 109, a pre-processing unit 103 for geometrical correction of photographic data, a macro region discrimination unit 105 for discriminating macro regions of a photographic image, a local area discrimination unit 107 for discriminating local areas contained within a macro region, a correction unit 113 for suitably correcting the local area, a compression unit 119 for compressing each macro region, a text processing unit 115 for processing text regions, an image integrating unit 127 for integrating and outputting a compressed image, a card memory 125 for storing image data, an AWB, AE, or like, calculation unit 123 for calculating each type for photography, and various buttons 121 including a shutter button 3.

The CPU 111 of the digital camera 1 may be provided with an external memory device 129, so as to read programs for controlling the digital camera 1 from a CD-ROM, floppy disk or the like.

Actual photography is described below using the block diagram of FIG. 4. The thick arrow in FIG. 4 represents the flow of image data, and the thin arrow represents the flow of control data. When a user turned ON the power source of the camera, a scene is displayed via the photographic lens unit 4 on the viewfinder monitor 8, and is simultaneously projected through the CCD unit 109.

A user sets the document correction specification switch 7 to photograph a text document or to photograph a person or scenery. If it is detected that the shutter button 3 is turned ON, the CPU 111 specifies the CCD calculus of the CCD to the CCD 109, and when the calculus is completed, the CCD data are dumped to the CCD data RAM 101. Then, the image is displayed (freeze display) on the viewfinder monitor 8.

The image data transmitted from the CCD 109 are stored in the RAM 101. If the document correction specification switch 7 is ON, the digital camera 1 enters the document correction mode, and the data are generated in formats which specify different compression methods for each region such as PDF after document correction.

On the other hand, if the document correction specification switch 7 is OFF, the digital camera 1 enters the scenery mode, and generates image compression data directly in the JPEG format, or the like. After data processing in the various modes, the CPU 111 directs the storage of data to the card memory 125. The card memory 125 may be a hard disk, or an external memory device or terminal, or the like. The image data may also be output to a printer or monitor without compression. The macro region discrimination, local area discrimination, and optimum correction processing described later may be accomplished internally by the digital camera 1, or may be accomplished by transmitting the data to another camera connected to the digital camera 1, or a terminal such as a personal computer or the like.

The processing flow described below pertains to when the document correction specification switch 7 is ON.

Figure 5:
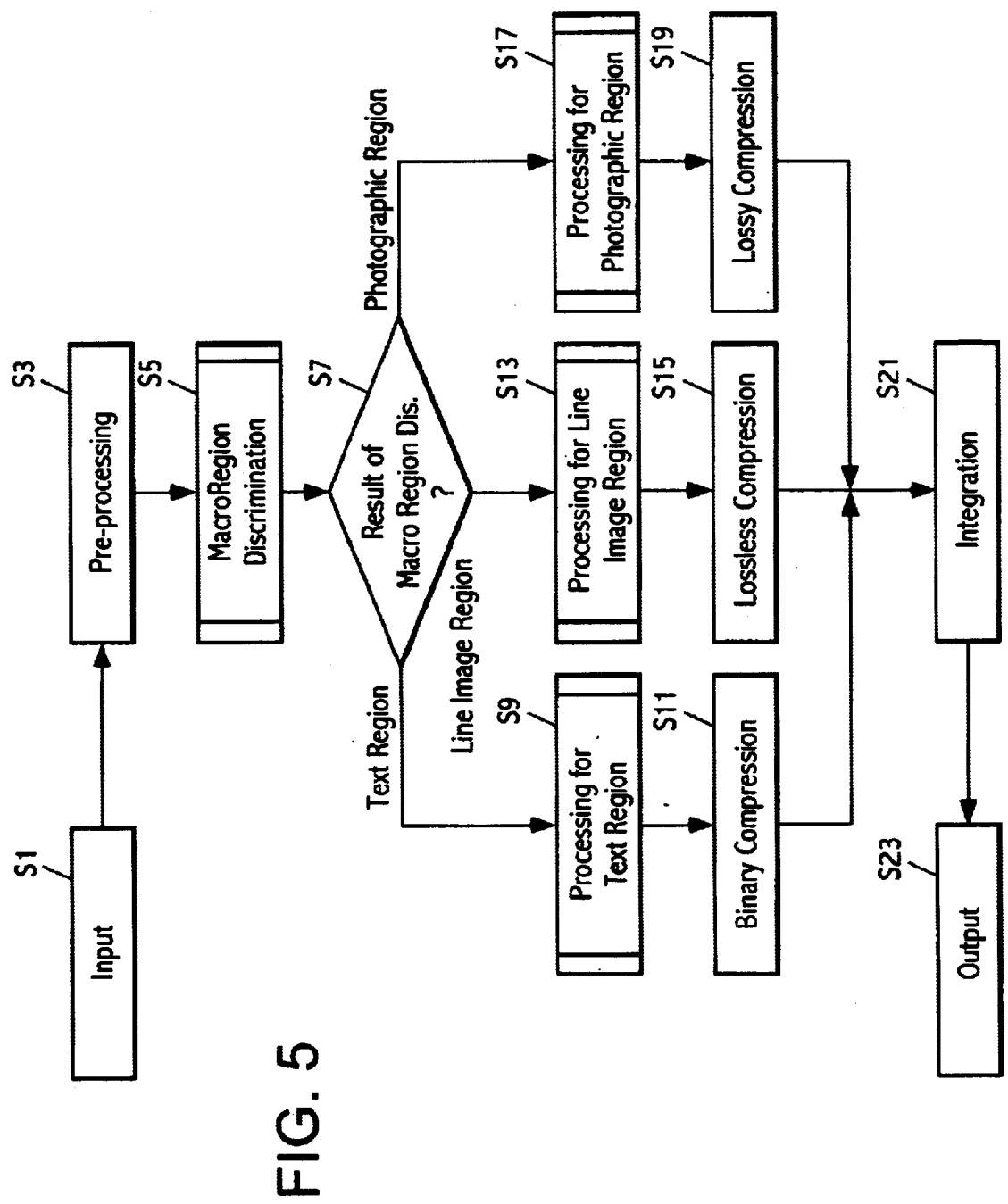

FIG. 5 is a flow chart showing the overall process flow when the document correction specification switch 7 is ON. When image data obtained from a photograph are input (S1), the data are subjected to pre-processing (S3). Then, the data are discriminated for macro region (S5). In this way, the image data are divided into text regions, line image regions, and photographic regions. Processing such as resolution conversion, text correction, binarization and the like are performed on text regions (S9). Thereafter, the text region is subjected to binary compression (S11). The text region also may be subjected to optical character recognition (OCR), and character code conversion.

Line image regions and photographic regions are subjected to local area discrimination, the attributes of each pixel or local area are determined, and suitable correction is performed in accordance with each attribute (S13, S17). The line image region processing (S13) and photographic region processing (S17) of FIG. 5 include processing to discriminate local areas in macro regions, and suitable correction for each macro region.

Lossless compression is performed on line image regions (S15), and Lossy compression is performed on photographic regions (S19). The respective compressed data are integrated (S21), and output to the card memory 125.

The pre-processing (S3) of FIG. 5 includes correction prior to macro region discrimination, correction image geometric deformation due to lens distortion, rotational shift, swing and tilt and the like, as well as correction for exposure, color balance, shading and the like. The macro region discrimination (S5) means the discrimination of the overall attributes of a square region of a compression unit.

In the digital camera 1, discrimination of local characteristics is performed for each pixel or block (local area), and correction processing in accordance with the characteristics discrimination result is performed as processing suited to the attributes of each macro region. The former process is referred to as local area discrimination, and the latter process is referred to as optimum correction.

The compression method changes in accordance with the macro region discrimination result, and optimum compression is executed (S11, S15, S19).

In general, paper documents include text regions, line image regions, and photographic regions. A text region is a square region comprising only text of black characters. A line image region is a square region mainly comprising a monochrome region and an edge region, e.g., a bar graph, solid image or the like. A photographic region is a square region mostly containing areas of changing gradients, such as drawings, illustrations, and textures.

A text region mainly comprises areas including black, which are formed of text, and white areas formed of background. Gradient information and color information are not very important in text regions. On the other hand, there is less image information when there are fewer gradients and colors. That is, if the resolution is adequate, a text region is a binary image and produces excellent image quality even when compressed.

If text is recorded as character coded and binary compression is used, the compression ratio is increased even more, such that when the text in a paper document is written in a common font and the font information is relatively unimportant, text recognition may be performed to convert the text to character code when storing the text region to memory. Conversely, when a user attaches importance to handwritten information and font information, the text region may be subjected to binary compression. Current schemes such as JBIG may be used for binary compression.

A line image region mainly comprises monochrome areas and edge areas, and most areas do not have a density change. Since there is a loss of image quality when Lossy compression is used, it is desirable to use Lossless compression to avoid a deterioration of image quality in data in which large image quality loss is caused by repeated compressions. When the Lossless compression method is used, the compression ratio is frequently lower.

In Lossless compression, however, run-length, pattern matching, and predictive coding are mainly used, such that the compression ratio increases when regions having identical densities, e.g., monochrome region and edge region, are contiguous. Therefore, Lossless compression is performed on the line image region (S15).

Even though a region may appear generally monochrome to the human eye, in a digitized image there are contiguous pixels having exactly identical pixel values (pixel density value) due to the resolution of the print on a paper document itself, or noise and irregularity dependent on the lighting or digital camera 1. On an original paper document, the information of such noise and irregularity is not important. That is, it is desirable that there be no noise or irregularity in the digitized image. It is further desirable that there be no noise or irregularity so as to improve the compression ratio when using Lossless compression as stated above. Current methods such as PNG and the like may be used as the Lossless compression method.

In this way, monochromatization is performed on areas discriminated as monochrome areas within the image data, and smoothing in the edge direction is performed on areas discriminated as edge areas so as to eliminate noise and irregularities. That is, optimum correction is performed on each discriminated local area.

Since the macro region discrimination is executed in square units, the gradient areas are also included in macro regions discriminated as line image regions. Such areas are subjected to smoothing to prevent a reduction in compression ratio and loss of image quality due to noise.

Photographic regions mainly comprise areas of changing gradients, and there is a high possibility that these areas contain important information. Accordingly, in photographic regions, processing is executed to maintain the gradient changes. Specifically, in a photographic region, there are few areas discriminated as monochrome areas or edge areas. Furthermore, regions discriminated as monochrome areas are not subjected to complete monochromatization so as to stop processing at a degree producing subtractive color. The degree of edge adjustment is also restricted. Photographic regions are treated using Lossy compression due to the greatly reduced compression ratio when such data are compressed using Lossless compression. Current methods such as JPEG DC base compression may be used as the Lossy compression method.

Each step shown in FIG. 5 is described in detail below.
Pre-processing (S3)

Figure 6:
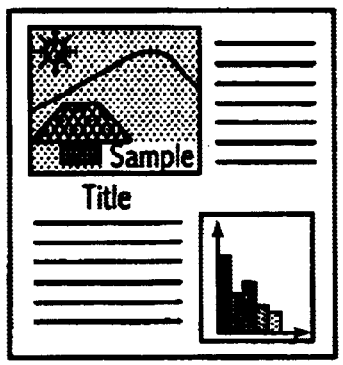
FIG. 6 shows an example of a document.
Figure 7:
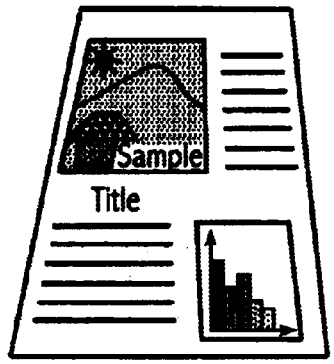
FIG. 7 illustrates the generation of swing and tilt when photographing a document.
Figure 8:
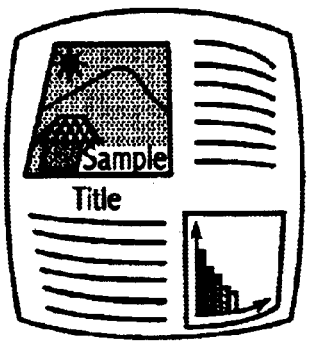
FIG. 8 illustrates the generation of distortion when photographing a document.

FIG. 6 illustrates a document photographed by the digital camera 1, and FIGS. 7 and 8 show examples of image data obtained by photographing the document of FIG. 6 using the digital camera 1. As shown in FIGS. 7 and 8, swing and tilt (FIG. 7), and rotational dislocation and distortion (FIG. 8) are generated in the image data by the photographic angle, lens distortion and the like. In general, photographic regions in documents are square. Accordingly, if there is no swing and tilt, rotational dislocation, or distortion, the region can be accurately cutout, and an optimum compression can be readily achieved with respect to compression ratio and image quality. However, difficulties readily arise when swing and tilt, rotational dislocation, and distortion occur.

Figure 9:
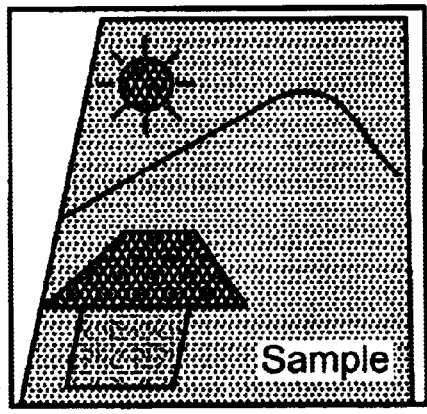
FIG. 9 illustrates problems when a photographic region is not square.

FIG. 9 shows an example in which a photographic region having swing and tilt cannot be cutout as a square region. As shown in FIG. 9, image compression attains an extremely high compression ratio because the macro region discrimination result includes an image outside the photograph (shaded area).

Figure 10:
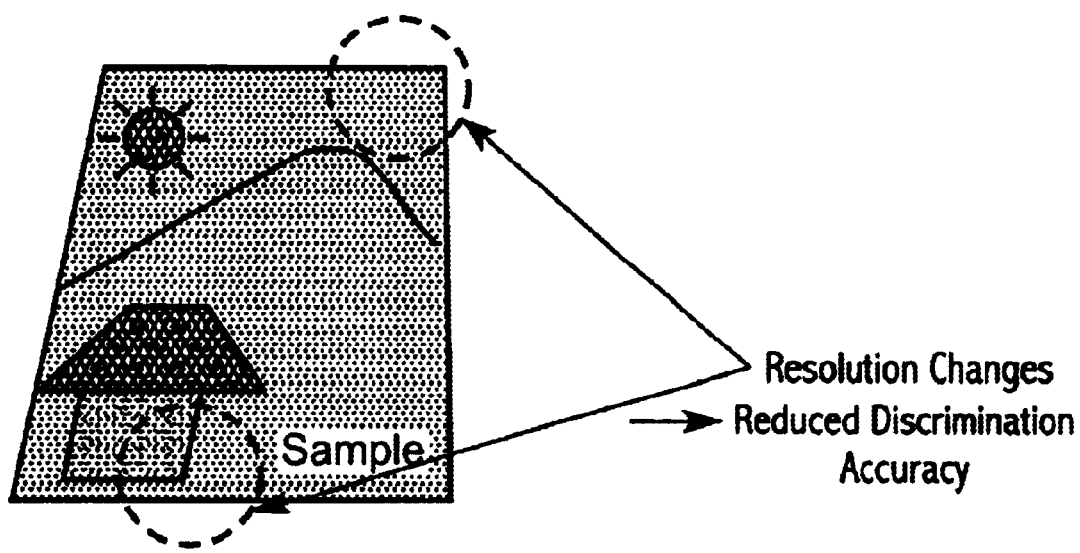
FIG. 10 illustrates problems arising from differences in resolution.

When a text region is subjected to OCR, the discrimination accuracy is readily reduced by swing and tilt, rotational dislocation, and distortion which cause distortion and shifting of the text. As shown in FIG. 10, the accuracy of discrimination of regions and attributes disadvantageously changes depending on the position of the image because the resolution changes depending on the position of the image.

In the present embodiment, this disadvantage is eliminated by pre-processing to correct swing and tilt, rotational dislocation, and distortion before processing for optimum correction, optimum compression, and macro region discrimination. In this way, the accuracy is improved for macro region discrimination, and local area discrimination prior to optimum correction. Furthermore, this preprocessing allows optimum correction and optimum compression to be readily accomplished.

A photographic angle causing swing and tilt can be readily identified by the camera distance information and the shape of the document and the like. Rotational dislocation can be readily corrected by the shape of a document and the text array direction. Distortion can be corrected by storing in the camera beforehand the correction sequence applicable to the presumed lens characteristics. A table or the like may be used for converting pixel position.

Figure 11:
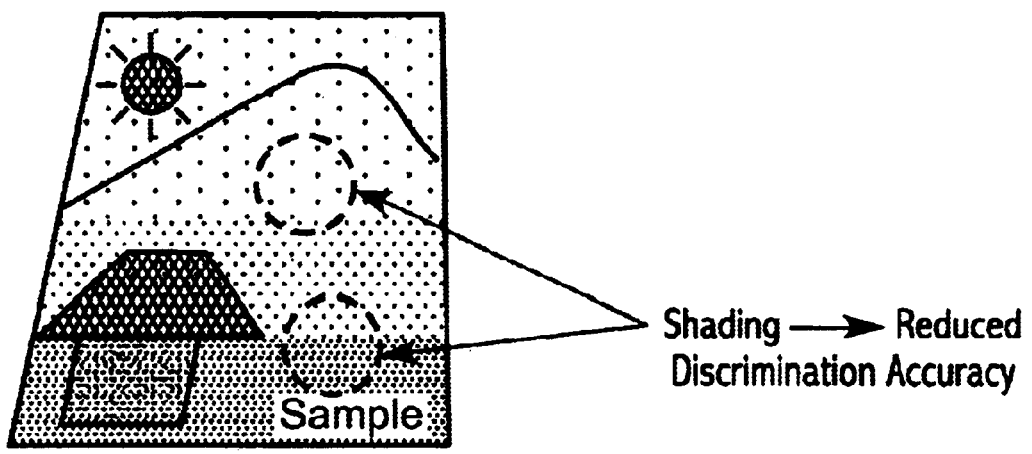
FIG. 11 illustrates problems of shading.

FIG. 11 shows an example of changing pixel value by image position caused by shading. In this instance, discrimination accuracy is adversely affected because the threshold values used for discriminating regions and attributes are not constant. Accordingly, this shading also is corrected by pre-processing before processing for optimum correction, optimum compression, and macro region discrimination.

Similarly, preprocessing corrects exposure, color balance, white balance, dynamic range and the like which are not dependent on photographic conditions or lighting conditions. Such corrections are accomplished using current art such as using various sensor values, using average values of each color component in the entire image, and detecting background so as to base color matching on the background area.

Figure 12:
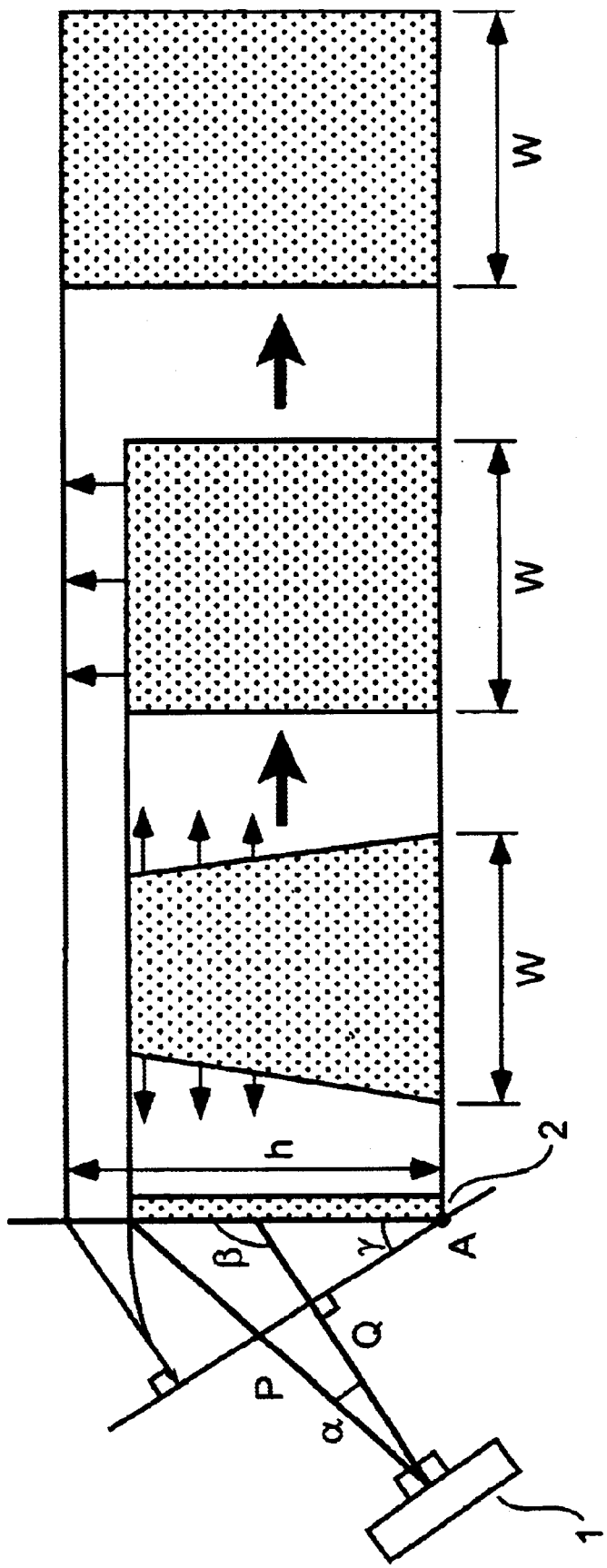
FIG. 12 shows an example of swing and tilt correction.

FIG. 12 illustrates the method for correction swing and tilt via an example of geometrical correction. Region A of FIG. 12 shows the positional relationship between the digital camera 1 and a document 2 being photographed. In FIG. 12, reference symbol P refers to the distance from the digital camera 1 to the edge of the document 2 farthest from the camera 1. The document 2 is detected by detecting the background edge area. Reference symbol Q represents the distance from the digital camera 1 to the document 2 in the optical axis direction. Reference symbol A represents the document edge nearest the camera 1.

The angle formed between the optical axis and the direction from the camera 1 to the edge of the document 2 farthest from the camera 1 is designated angle $\alpha$, the angle formed between the optical axis and the document 2 is designated angle $\beta$, and the angle formed between the document 2 and a plane perpendicular to the optical axis is designated angle $\gamma$.

Reference symbol h represents the height of the document 2 when the document 2 is rotated in a plane perpendicular to the optical axis and photographed on the optical axis of the plane of the document 2. The height reduced by the effect of the photographic angle can be corrected by increasing the height of the obtained document to h. In normal photography, the document size, photographic distance, and photographic angle often will have the same values, such that geometrical correction can be accomplished subsequently using fixed values.

Region B of FIG. 12 shows an image with swing and tilt (shaded area) caused by taking a photograph with the positional relationships shown in region A of FIG. 12.

Region C of FIG. 12 shows the correction of the width of the image of FIG. 12 based on the width W of the image at position A. Specifically, the total document image width is designated W.

Region D of FIG. 12 shows the correction of the image of FIG. 12 by enlarging the height to h.

An image corrected for swing and tilt (region D of FIG. 12) is obtained by the process described below.

Figure 13:
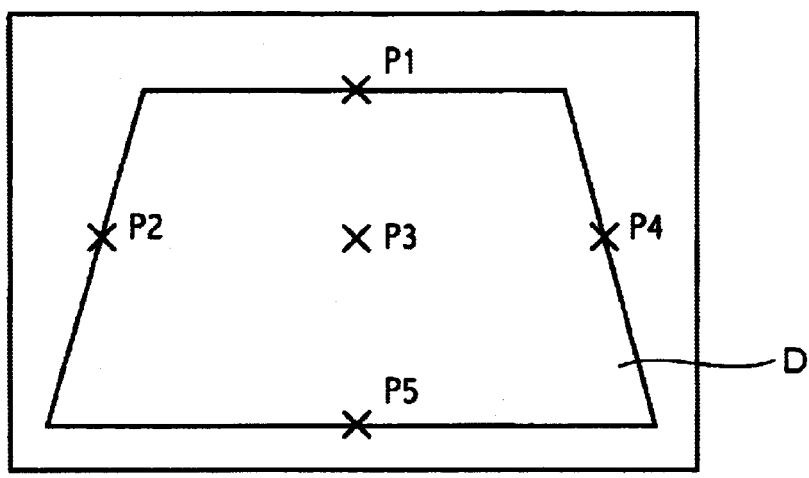
FIG. 13 illustrates methods of obtaining measurement data for swing and tilt correction.

Swing and tilt correction may be accomplished even when the document size, photographic distance, photographic angle and the like differ by using distance information obtained by sensors provided in the camera. Referring now to FIG. 13, these corrections are accomplished when photographing a document image D by measuring the distance to the document from a plurality of points P1 through P5 so as to equalize the distance to all points.

Macro Region Discrimination (S5)

Figure 14:
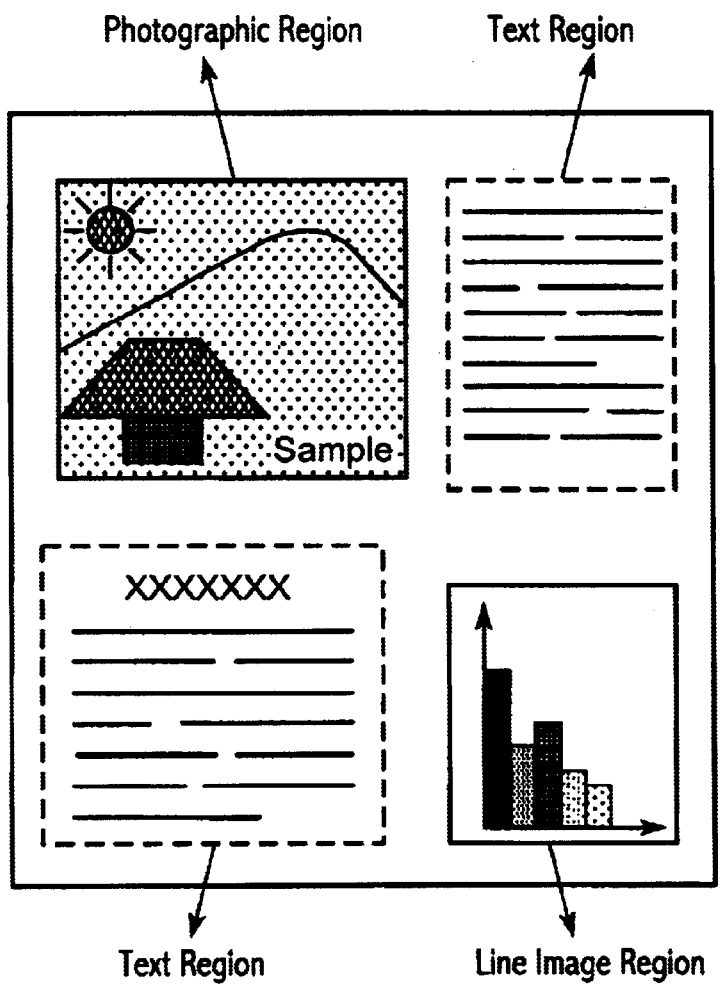
FIG. 14 shows image data divided into macro regions.

FIG. 14 shows the conditions when discriminating macro regions in a document image containing text regions, a photographic region, and a line image region.

The macro region discrimination methods are described below.

Figure 15:
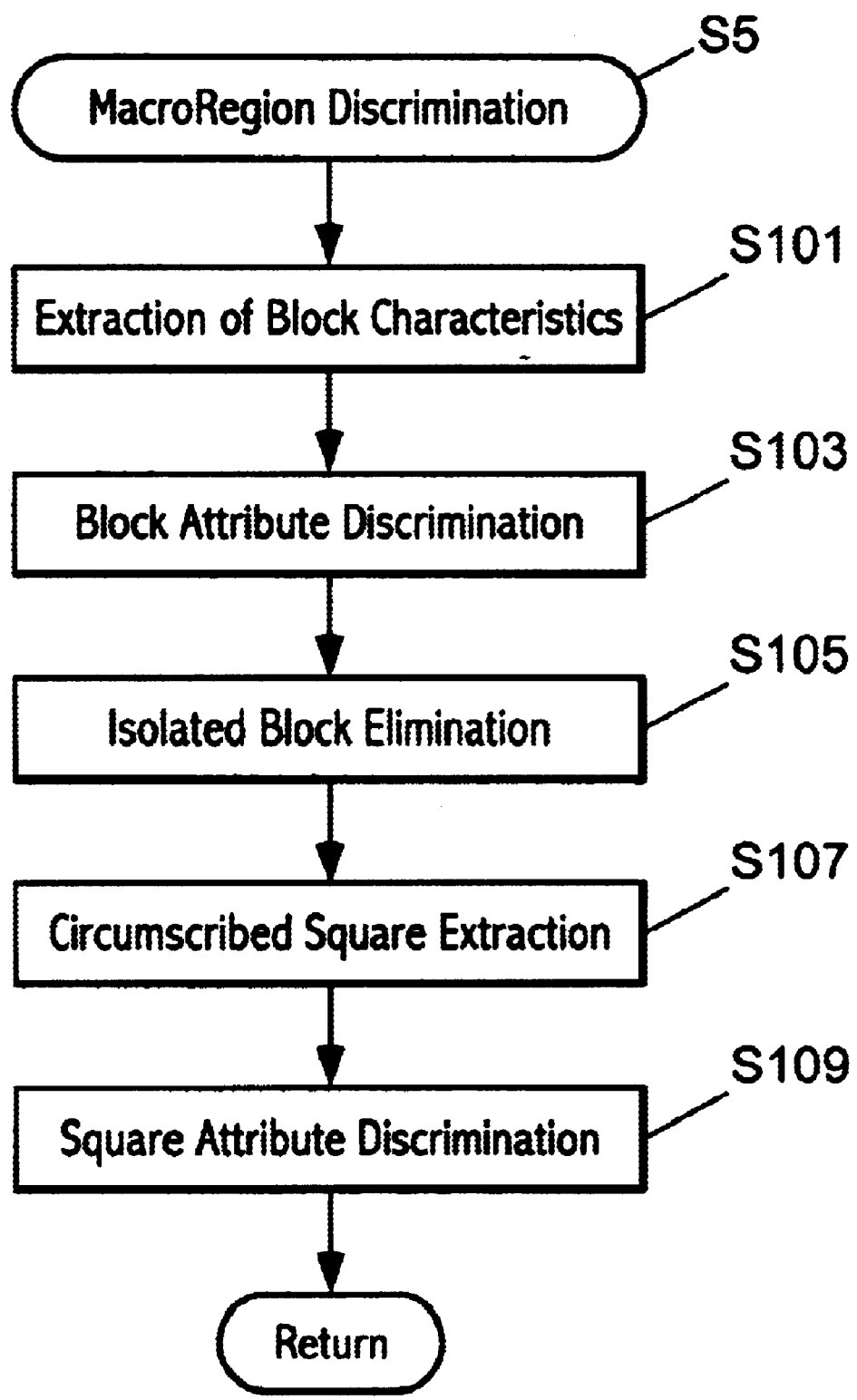
FIG. 15 is a flow chart showing the content of macro region discrimination (S5) of FIG. 5.

FIG. 15 is a flow chart showing the content of the macro region discrimination process (S5) of FIG. 5. First, all of the image data are divided into blocks (in this instance, each block comprises 8×8 pixels), and the characteristics of each block are extracted (S101). Block characteristics are the pixel density Max-min value (the maximum value-minimum value of the pixel density within one block), pixel color Max-min value (maximum value-minimum value of pixel color within one block), pixel color average value (average value of pixel color within one block), pixel density average value (average value of pixel density within one block), and dot count value (number of pixels having a maximum or minimum pixel density relative to the four pixels adjacent to a specific pixel density within one block).

The attribute of each block is discriminated from the characteristics of each block (S103). Specifically, each block is discriminated as to whether or not it is a background block, a text block, or a photo\line image block based on the characteristics of each block. A text attribute binary map and photo\line image attribute binary map are generated based on the discrimination result. The text attribute binary map is a map wherein each text block area is designated [1], and the other areas are designated [0]. The photo\line image attribute binary map is a map wherein each photograph or line image block position is designated [1], and the other areas are designated [0].

The characteristics of the photograph and line image are given below in block units, attributes are treated as identical because discrimination is difficult at this stage.

The sequence of the specific block attribute discrimination process is described below.

1) A block having an average pixel color value that is greater than a specific threshold value is designated a photo\line image block, and is recorded as [1] in the photo\line image attribute binary map.

2) Among the remaining blocks, a block having a dot count value that is greater than a specific threshold value is designated a photo\line image block, and is recorded as [1] in the photo\line image attribute binary map.

3) Among the remaining blocks, a block having a pixel density Max-min value that is greater than a specific threshold value is designated a text block, and is recorded as [1] in the text attribute binary map.

4) Among the remaining blocks, a block which has a pixel density Max-min value in an intermediate range (the Max-min density value is between one specific threshold value and another threshold value) is designated a photo\line image block, and is recorded as [1] in the photo\line image attribute binary map.

5) Among the remaining blocks, a block having a high average pixel density value is designated a photo\line image block, and is recorded as [1] in the photo\line image attribute binary map. Any remaining blocks are designated text blocks, and are recorded as [1] in the text attribute binary map.

As a result, the positions of the photo\line drawing blocks and the text blocks are recorded as [1] in the generated binary maps.

Then, wrong-discrimination block correction (isolated block elimination) is executed (S105). In general, wrong-discrimination blocks are isolated since regions having the same attributes will have a particular size. Accordingly, wrong-discrimination block correction is accomplished by removing isolated blocks from the binary maps resulting from the block attribute discrimination.

Specifically, in a binary map, a target block containing a 3×3 block area is examined, and if the value is [1] above a specific threshold value, the target block is designated [1], whereas if a specific threshold value is not exceeded, the target block is designated [0].

Next, the photo\line image region and text region are extracted from the corrected binary map by circumscribed square (S107). The method of circumscribed square extraction is shown in FIG. 16 and described below.

1) The binary map is scanned line by line from top to bottom, and if one block is recorded [1], that line is designated the region starting line (line (1)).

2) The scanning continues directly, and any line not having one block recorded [1] is designated the region ending line (line (2)), and the lines in-between are designated region candidates.

3) This time the block is scanned between region candidates in the horizontal direction vertical line by vertical line, and similarly the region starting line (line (3)) is designated, and the region ending line (line (4)) is designated, and the square region circumscribed by the vertical and horizontal starting lines and ending lines is extracted.

4) This sequence is repeated a plurality of times, and the circumscribed square region is extracted (lines (5) through (8)).

The aforesaid sequence is executed for the text attribute binary map, and photo\line image attribute binary map, and the text regions, and photo\line image regions are respectively extracted as squares. Then, the extracted photo\line image region is examined for the distribution of the pixel color Max-min value within the square region extracted as the block characteristic. The color Max-min value will occur in large blocks in photographic regions and occur in small blocks in line image regions. Therefore, square regions in which blocks having a color Max-min value greater than a specific threshold value exceed a fixed number are designated photographic regions, and the other regions are designated line image regions.

The aforesaid sequence is followed to extract the macro region, text region, photographic region, and line image region.

Text, Line Image, Photographic Region Processes (S9, S13, S17)

These processes discriminate whether or not a local area within a macro region is an edge area, a gradient area, or a monochrome area, and optimum correction is executed based on the discrimination result.

Figure 17:
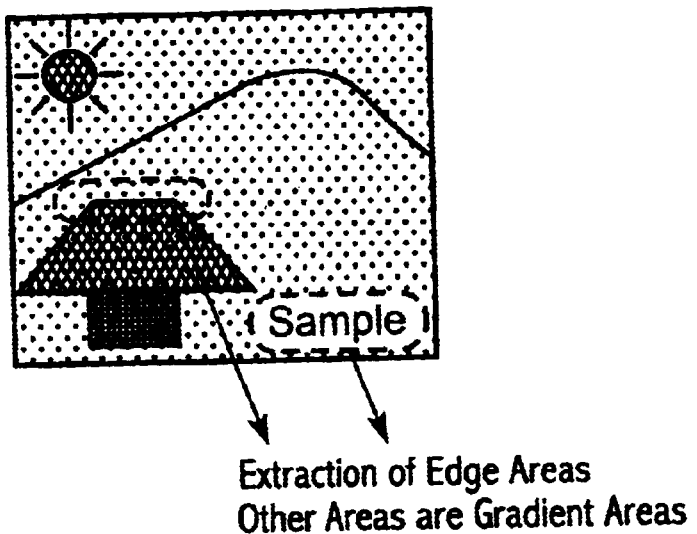
FIG. 17 is a first drawing illustrating local areas included in a macro region.

FIG. 17 shows the condition when local area discrimination is executed in the photographic region included in FIG. 14, and gradient areas and edge areas are detected. As shown in the drawing, the periphery of the area in which the text is written within the photographic region, and the area of particularly severe change in pixel density are discriminated as edge areas, and other areas are discriminated as gradient areas.

Figure 18:
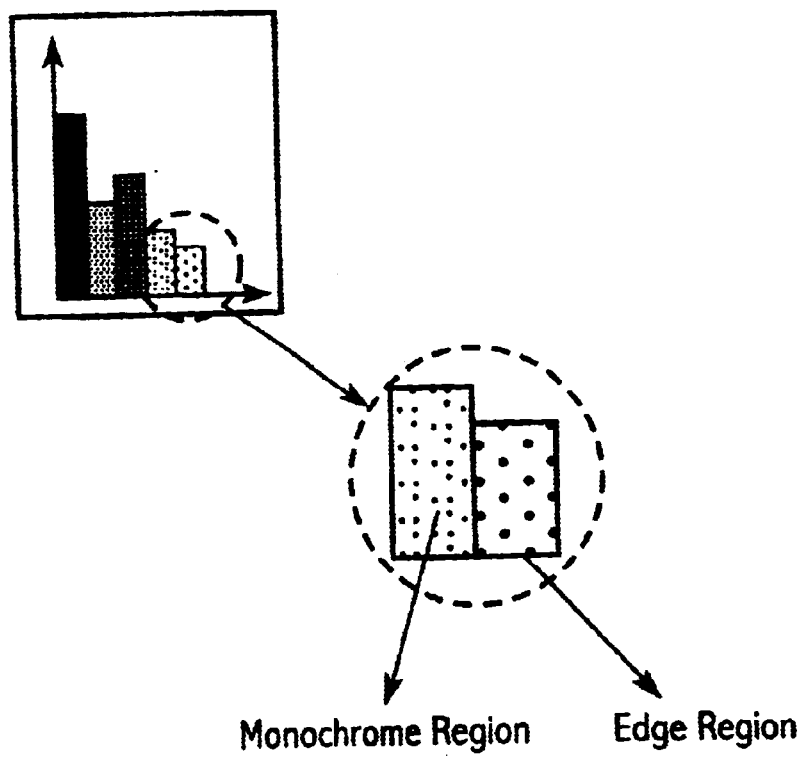
FIG. 18 is a second drawing illustrating local areas included in a macro region.

FIG. 18 shows the result of discriminating a local area within the line image included in FIG. 14. In FIG. 18, a monochrome region (a region having almost no change in pixel color, brightness, or chroma), and edge regions are detected within the line image region.

The content of the processes of local region discrimination and optimum correction must change depending on the attributes in the line image region and photographic region.

The region discriminated as a line image region by the macro region discrimination is mainly a line image, colored text, or colored background. That is, monochrome regions and edge regions are relatively abundant. In such a region, small gradient changes of the image are not of great significance. For example, if the image is a graph, the content expressed in the graph has great significance, and if the line image is colored text, the text content and ease of discriminating background are very significant. Accordingly, a gradient region in a line image region is not affected by wrong-discrimination of an edge area and a monochrome area.

Accordingly, in local area discrimination within a line image, the threshold values are set so as to easily extract edge areas and monochrome areas, and processing is executed. In order to greatly compress the size of a series of monochrome areas, in the optimum correction process, the number of monochromatization areas included in the series of monochrome areas is set low whether subtractive coloring by completely monochromatizing a monochrome area (not executing subtractive coloration), or providing a plurality of monochromatization areas within a single monochrome area.

When the degree of monochromatization is increased, the degree of edge adjustment is increased because irregularities of the edge areas of the border regions of similar monochromatization areas becomes readily conspicuous. In a line image region, there is a high possibility that an area discriminated as a gradient region in the local area discrimination is not a significant area, and there is a further possibility that the area is noise. Accordingly, processing is executed to increase the degree of smoothness of the gradient region. In this way, image quality can be improved and unnecessary high frequency areas can be eliminated, thereby improving the compression ratio.

On the other hand, a region discriminated as a photographic region in the macro region discrimination process mainly comprises photographs, texture and the like, and includes a relatively high number of gradient areas. The complex change in gradients in these regions are often highly significant. Therefore, there is a large loss in image quality when a gradient area is wrongly discriminated as an edge area and subjected to edge adjustment, or wrongly discriminated as a monochrome area and subjected to monochromatization. To prevent these errors, the threshold value is set for local area discrimination to readily extract gradient areas.

In order to suppress image quality deterioration as much as possible via optimum correction, even if wrong-discrimination occurs, the degree of edge adjustment is restricted to a low level, and monochromatization and subtractive coloration are stopped by dividing monochrome areas into a number of small monochromatization areas without complete monochromatization of a series of monochrome areas.

Figure 19:
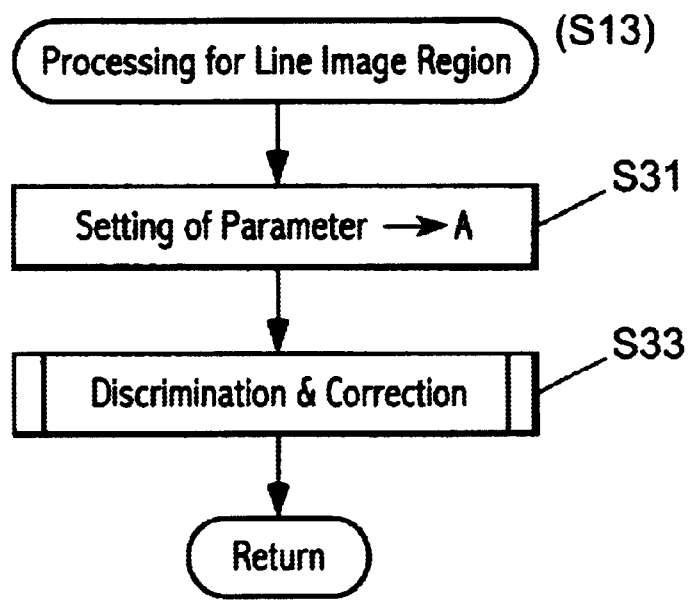
FIG. 19 is a flow chart showing the content of the line image region process (S13) of FIG. 5.

FIG. 19 is a flow chart showing the content of the line image region process (S13) of FIG. 5. The parameter set in step S31 is designated A. Discrimination and correction are executed in step S33.

Figure 20:
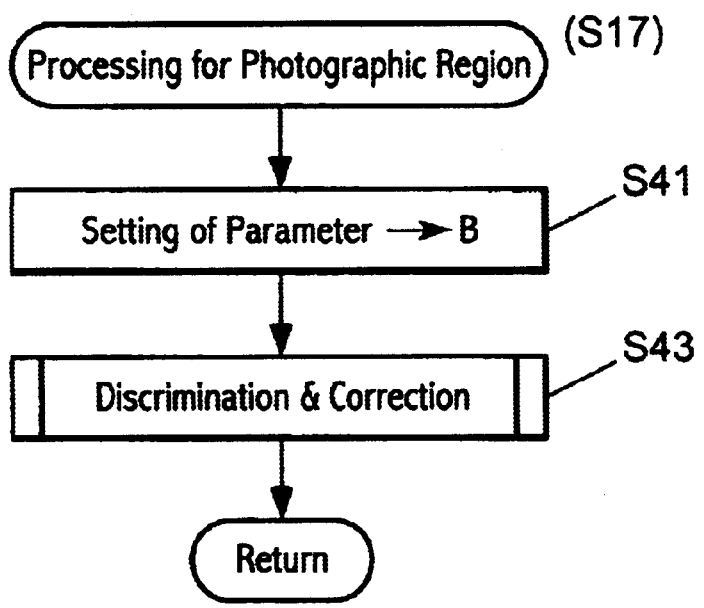
FIG. 20 is a flow chart showing the content of the photographic region process (S17) of FIG. 5.

FIG. 20 is a flow chart showing the content of the photographic region process (S17) of FIG. 5. The parameter set in step S41 is designated B. Discrimination and correction are executed in step S43.

The setting A and setting B represent the setting of parameter corrections relating to the discrimination of local areas and optimum correction. When setting A is used, local areas are discriminated to produce a higher percentage of monochrome areas and edge areas than when setting B is used. In the correction process, the degree of monochromatization (subtractive coloration) and edge adjustment are increased to produce a higher degree of smoothing in the gradient process.

FIG. 21 illustrates the contents of setting A and setting B. Setting A is used when the macro region is a line image region, and the threshold values used in local area discrimination are threshold value TH1, which is increased, and threshold value TH2, which is decreased. In the smoothing filter in the edge direction, the degree of smoothing is increased. The degree of subtractive coloration is increased in the subtractive coloration process, so as to more nearly approach the monochromatization process (or complete monochromatization process).

On the other hand, setting B is used when the macro region is a photographic region, and the threshold value TH1 is reduced and the threshold value TH2 is increased. The degree of smoothing is reduced in the smoothing filter in the edge direction, to reduce the degree of smoothing by the smoothing filter in the gradient process. The degree of subtractive coloration is also reduced in the subtractive coloration process.

Figure 22:
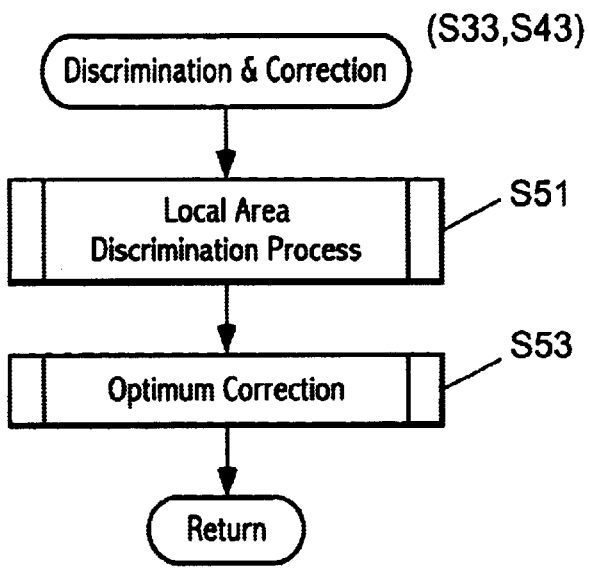
FIG. 22 is a flow chart showing the content of the discrimination and correction processes (S33, S43) of FIGS. 19 and 20.

FIG. 22 is a flow chart of the processing of discrimination and correction (S33, S43) in FIGS. 19 and 20. Local area discrimination is executed in step S51, and optimum correction is executed in step S53. These processes are executed based on the parameters of setting A or setting B.

Figure 23:
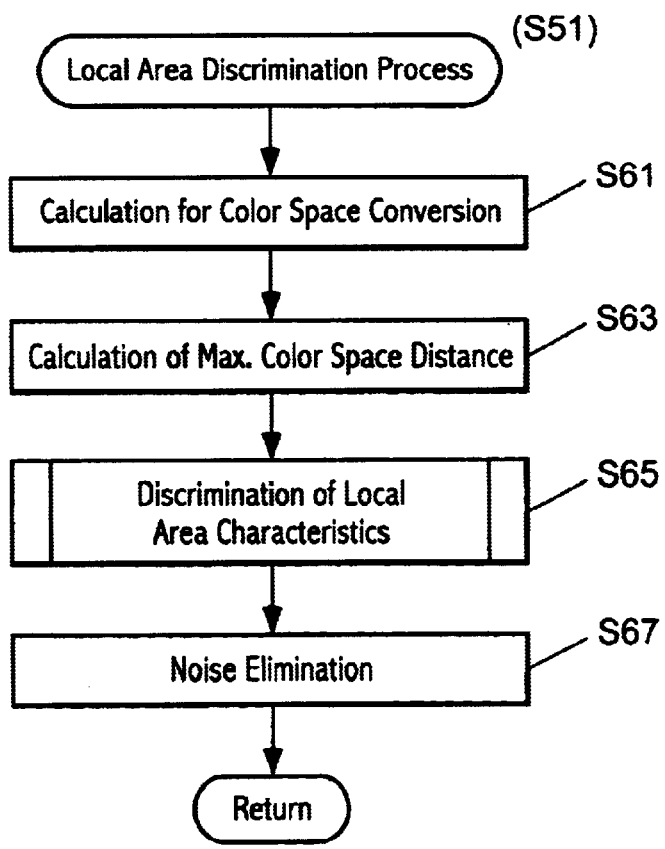
FIG. 23 is a flow chart showing the content of the local area discrimination (S51) of FIG. 22.

FIG. 23 is a flow chart showing the content of the local area discrimination process (S51) of FIG. 22. In step S61, the pixel values of the pixels included in the local area are converted to coordinates in the color space. In step S63, the maximum color space distance F within the local area is calculated based on the converted coordinates. In step S65, the local area characteristics are discriminated based on the maximum color space distance F. In step S67, noise is eliminated from the discrimination result.

In general, the change in pixel density in a gradient region is less pronounced than the change in an edge region, and is more pronounced than the change in a monochrome region. Therefore, when considering the distribution of color space pixel values within small blocks (local areas) of about 3×3 pixels and 5×5 pixels, the distribution range sequentially increases in the order of monochrome regions, gradient regions, and edge regions. In the present embodiment, the maximum distance in the color space of optional pixels within a block is used as an indicator expressing the distribution of pixels in color space. For example, when processing within a 3×3 pixel block, the color space distance is calculated for all two-pixel combinations among the nine pixels, and the maximum value F is designated the degree of change in pixel value (maximum color space distance F within the local area) of the center pixel in the block (S63).

Since the color space distance used in the local area discrimination and optimum correction may be either the degree of change in the density distribution of the text or photograph in the document, or a standard color deemed a different color by human visual perception, it is desirable to use color space or color difference based on human perception characteristics to improve discrimination accuracy and correction accuracy.

Values La* b*, Lu* v* and the like may be used as color space, and Hunter color difference, CMC color difference, Adams-Nickerson color difference, and the like, may be used as the color difference method.

To improve processing speed, color space dependent on the input device or processing device, for example, common RGB space, YUV space, and the like, may be used directly.

When it is desired to emphasize specific information, color space related to such emphasis may be used. For example, when hue information is considered important for local area discrimination, the HSB space may be used to increase the weight of the H value in the color difference method.

Figure 24:
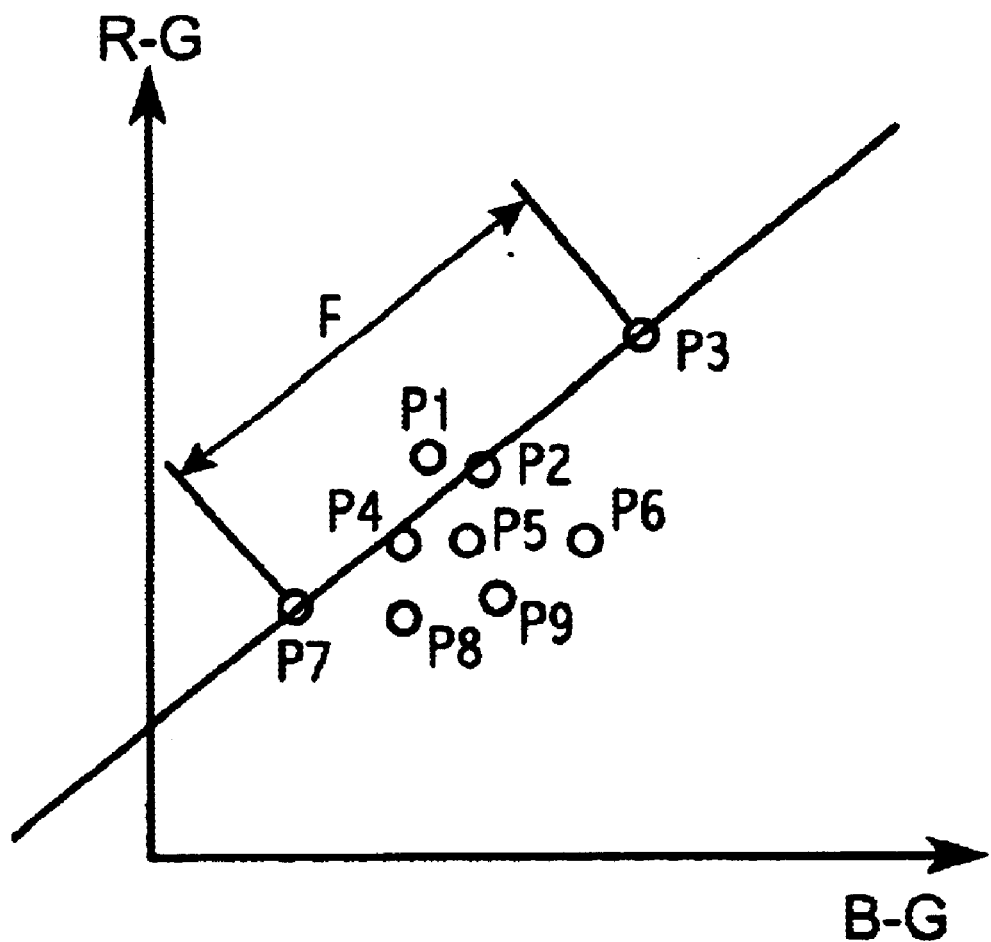
FIG. 24 illustrates the determination of the maximum color space distance F.

FIG. 24 plots positions P1 through P9 of 9 pixels within a 3×3 pixel block in the two-dimensional color space R-G, B-G. The maximum color distance F within the local area is the value of the color difference between P3 and P7.

Figure 25:
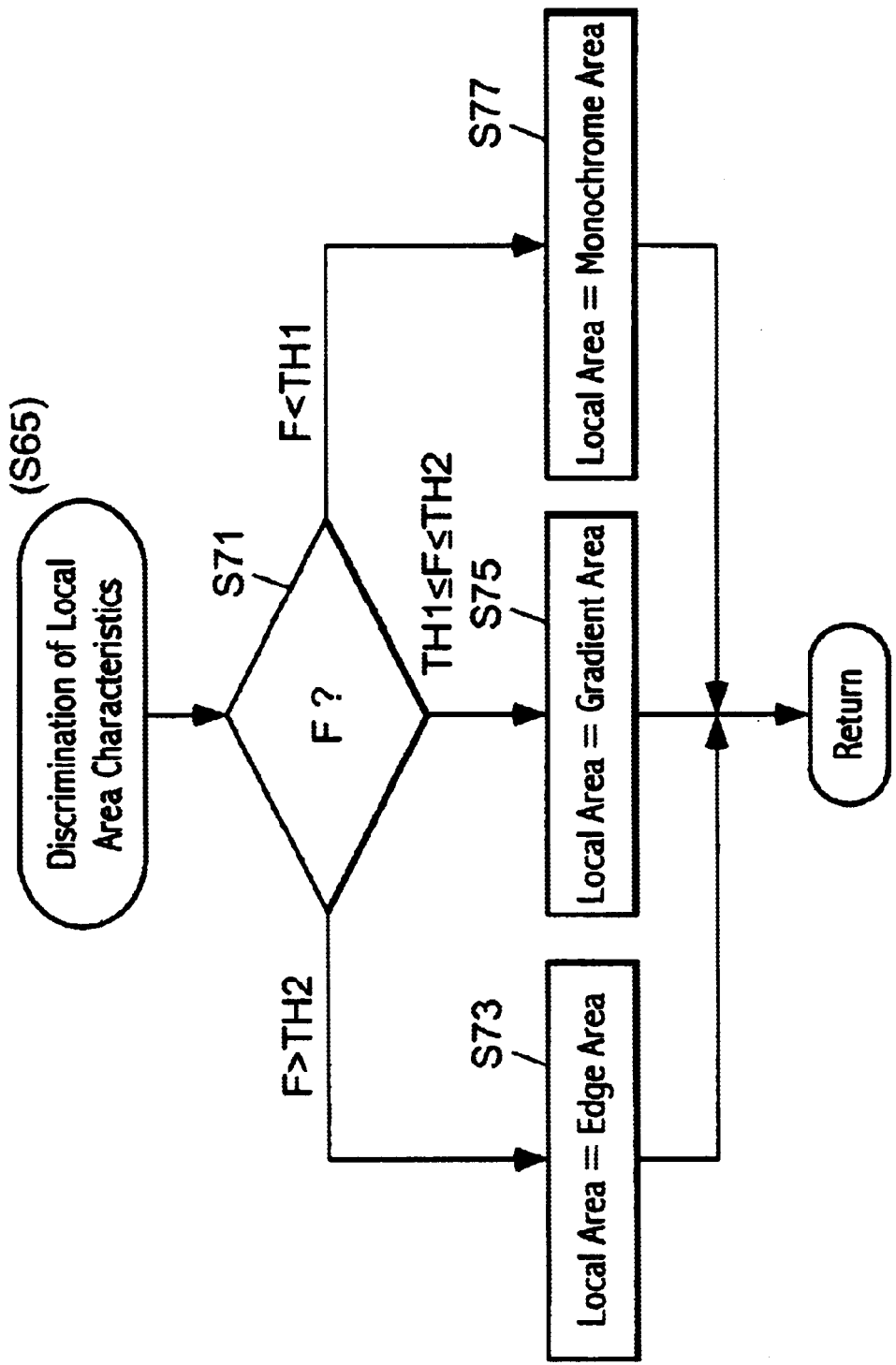
FIG. 25 is a flow chart showing the content of the region discrimination (S65) of FIG. 23.

FIG. 25 is a flow chart showing the content of the region discrimination process of FIG. 23. In step S71, the value of the maximum color space distance F within the local area is compared to threshold values TH1 and TH2. When F>TH2 and, the local area is discriminated as an edge area (S73). If F<TH1, the local area is discriminated as a monochrome area (S77). If TH1≦F≦TH2, the local area is discriminated as a gradient area (S75).

Figure 26:
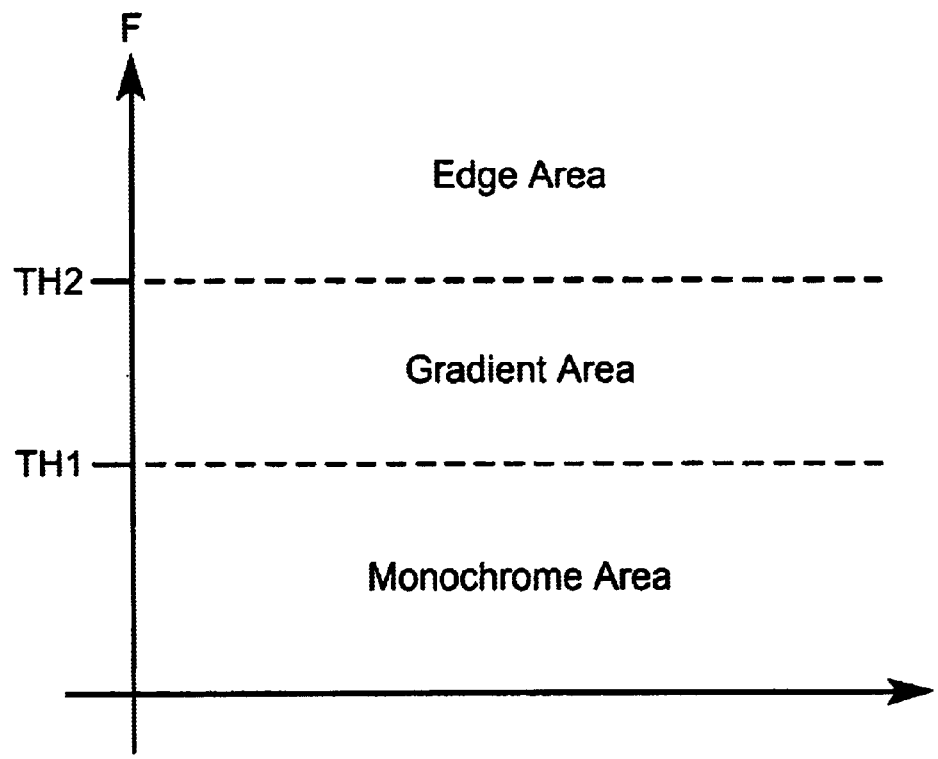
FIG. 26 illustrates the relationship between the thresholds TH1 and TH2 and the discriminated region.

FIG. 26 illustrates the relationships among the maximum color space distance F within a local area and the threshold values TH1 and TH2, and the discriminated local area. When the maximum color space distance F is less than the threshold value TH1, the area is a monochrome area; when the distance F is larger than the threshold value TH2 (>TH1) the area is an edge area; the remaining areas are gradient areas. As previously described, when the discrimination of a macro region results in a line image region, areas discriminated as monochrome areas and edge areas are larger, as shown in FIG. 26. On the other hand, when a macro region is discriminated as a photographic region, the threshold values are set so that the areas discriminated as a gradient area are larger, as shown in FIG. 26.

When Lossy compression is used for a photographic region, the threshold value TH1 is reduced and the threshold value TH2 is increased, whereas when the Lossless compression method is used in line image regions, the converse is true in that the threshold value TH1 is increased and the threshold value TH2 is reduced.

In this way, after a local area is discriminated, noise can be eliminated from the discrimination result (S67, FIG. 23). The reasons for this are described below.

Monochrome areas and edge areas often are contiguous and large in size. Accordingly, there is a high possibility that small monochrome areas and edge areas resulting from local area discrimination are noise or error discriminations. Even when such areas are not noise or error discriminations, contiguous small monochrome areas and edge areas do not see effective improvement in image quality or compression ratio even when subjected to monochromatization or edge adjustment.

Relatively small contiguous monochrome areas and edge areas may be integrated when adjacent areas are a certain size area via the distance to the area and the like, so as to eliminate as noise such areas from the local area discrimination result.

In gradient areas, smoothing is executed in accordance with the severity of the change in pixel values, as described later. For this reason, there is little processing performed on edge areas or gradient areas, whereas gradient processing is performed on monochrome areas for subtractive coloration effect. That is, there is little image deterioration even if the edge area or monochrome area is processed as a gradient area. Conversely, when adjacent areas are small in size, adverse effects to image quality and compression ratio are unlikely even if the edge area and monochrome area are processed as gradient areas, therefore the result of local area discrimination is appropriately processed as a gradient area.

Figure 27:
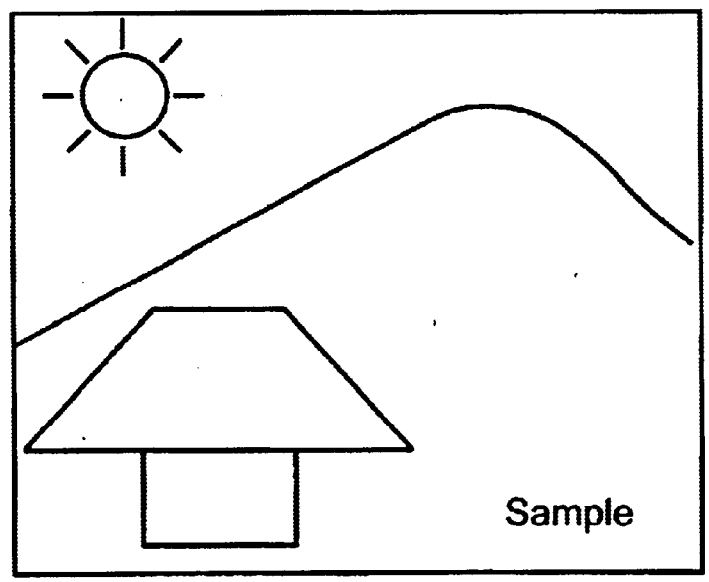
FIG. 27 shows a specific example of a macro region forming the subject of discrimination of a local area.
Figure 28:
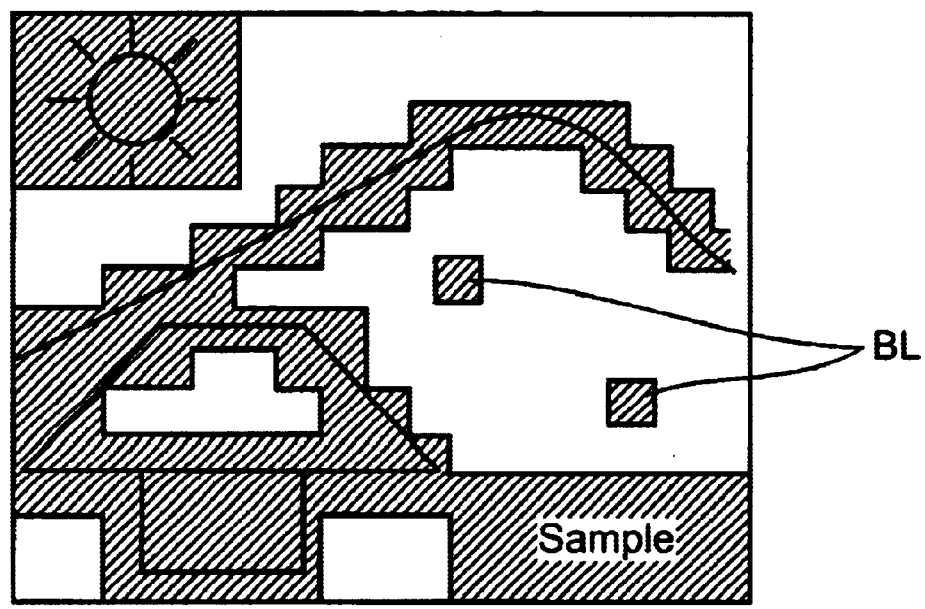
FIG. 28 illustrates the local areas discriminated from the sample in FIG. 27.
Figure 29:
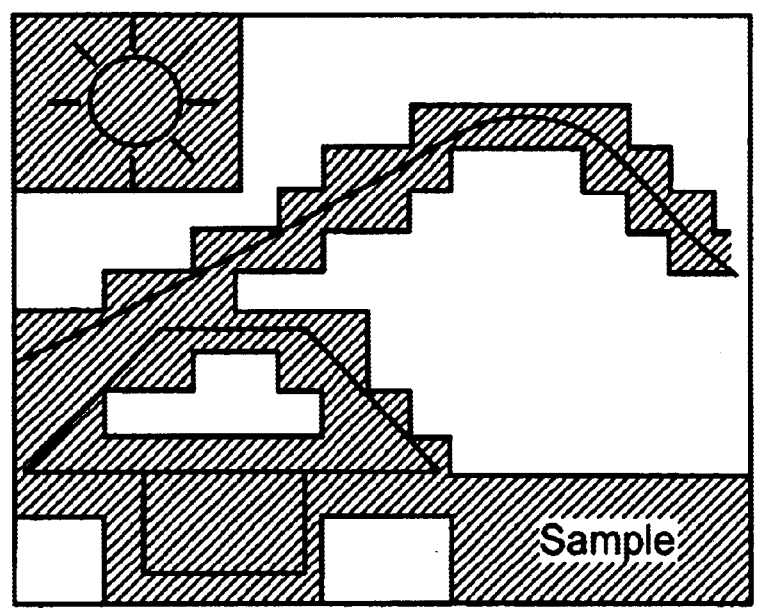
FIG. 29 illustrates noise elimination from the sample in FIG. 28.

FIG. 27 shows a document image, and FIG. 28 shows the image of FIG. 27 after processing, wherein local areas comprise edge areas indicated with shading, and gradient areas indicated without shading. The areas BL of small surface area resulting from local area discrimination in FIG. 28 are eliminated as noise, and the final result of local area discrimination is shown in FIG. 29.

Figure 30:
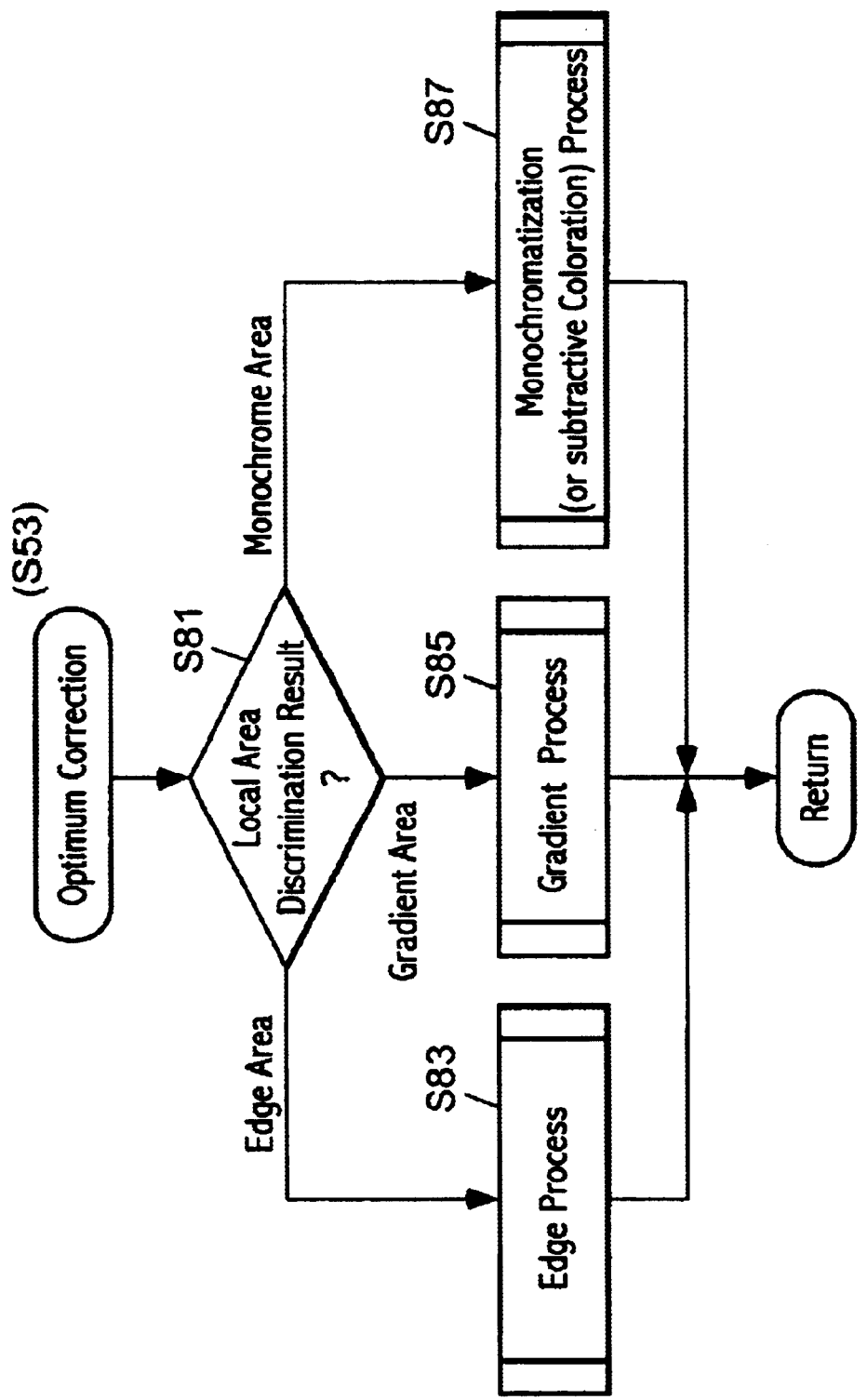
FIG. 30 is a flow chart showing the content of optimum correction (S53) of FIG. 22.

FIG. 30 is a flow chart showing the content of the optimum correction process (S53) of FIG. 22. When local area discrimination results in edge areas, gradient areas, and monochromatization areas, the edge process (S83), gradient process (S85), and monochromatization (or subtractive coloration) process (87) are executed, respectively.

Figure 31:
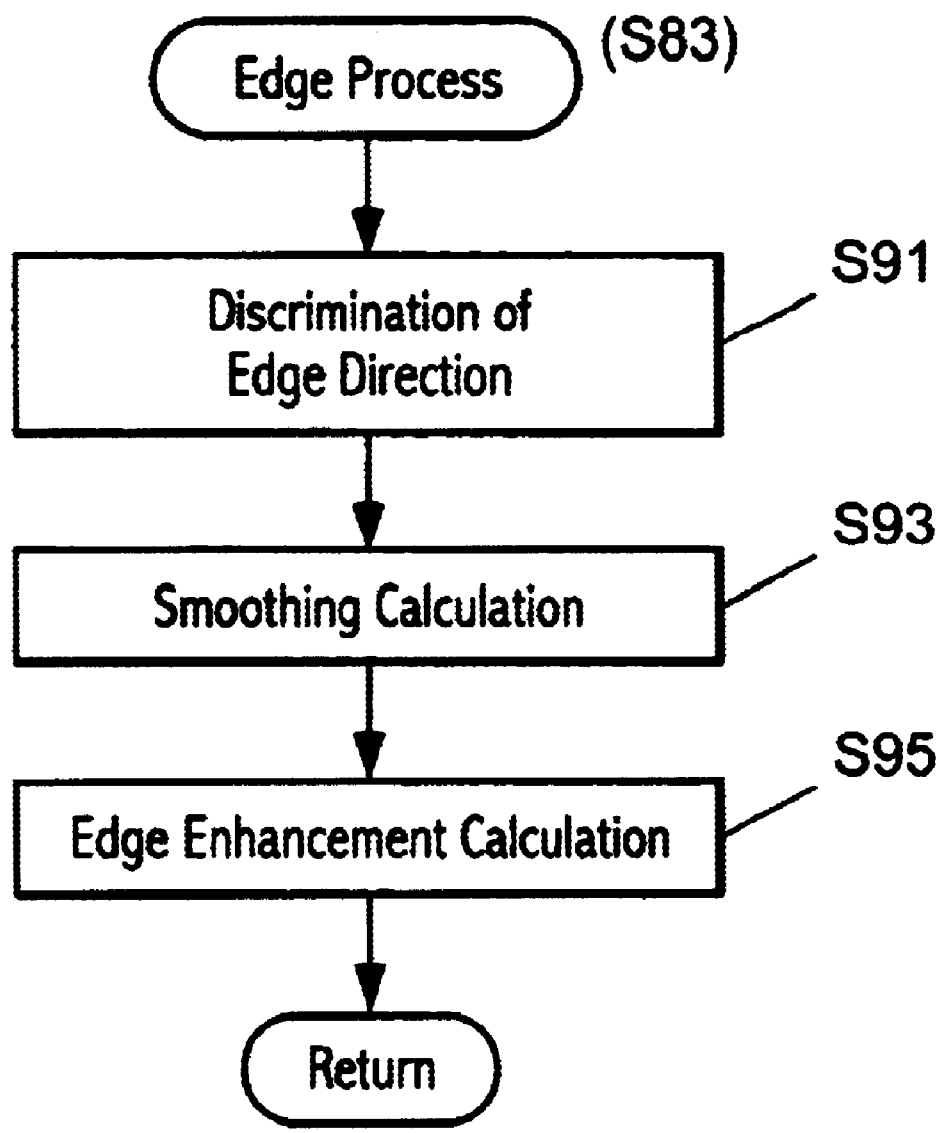
FIG. 31 is a flow chart showing the content of the edge process (S83) of FIG. 30.

FIG. 31 is a flow chart showing the content of the edge process (S83) of FIG. 30.

In the edge process, the direction of the edge is discriminated for the area specified as an edge area as shown in FIG. 32 (S91), smoothing is performed in the edge direction as shown in FIG. 33 (S93), and edge enhancement is performed in a direction perpendicular to the edge as shown in FIG. 34 (S95). In the discrimination of the edge direction, the presence of the edge is examined in both the vertical and horizontal directions, and when an edge occurs in only one direction among the vertical and horizontal directions, the direction having an edge is designated the edge direction for that pixel. In either case, if the edge direction cannot be specified, and edge correction is not performed.

The edge process is executed for 3×3 pixel blocks. Identical edge processing is performed even when the block size is changed to 5×5 pixels in accordance with proper zoom magnification.

Specific examples of edge discrimination in the horizontal direction are given below. FIG. 35 shows a 3×3 pixel block used to determine the presence of an edge. In FIG. 35, reference symbol E represents the area corresponding to the target pixel being subjected to optimum correction. In the area E, the presence of an edge in the horizontal direction is defined as an edge present between at a least one among ABC and DEF, or between DEF and GHI.

In determining the presence of an edge between ABC and DEF, when the input image is a variable density image, the presence of an edge is determined if the following conditions are satisfied: the change in pixel value is greater than a certain threshold THe1 and in the same direction for all three AD, BE, CF, or the change in pixel value is greater than a certain threshold value THe2 (>THe1) in the same direction for two or more among AD, BE, CF. An edge is not determined when neither of the aforesaid conditions is satisfied.

In the multidimensional color space of RGB, YUV, and the like, obtaining information relating to the edge direction requires the determination of the inner product and vector distance. Furthermore, suitable conditions must be met to evaluate whether or not the edges are in the same direction. When an input image is not a simple variable density image, determination of the presence of an edge between ABC and DEF requires that the sum of the color space distance between AD, BE, and CF is greater than a certain threshold value, and the color space distance of the average of ABC and the average of DEF is greater than K1 times (where K1 is a specific constant) the sum of the color space distance between AD, BE, and CF.

This determination is described below by way of example when the color space is RGB space.

The RGB color space distance between pixel P having a pixel value of (R,G,B)=(Pr,Pg,Pb) and pixel Q having a pixel value of (R,G,B)=(Qr,Qg,Qp) represents the magnitude of the three-dimensional vector (Pr-Qr, Pg-Qg, Pb-Qb).

A large color space distance between AB, BE, CF means there is a large change in pixel value between the aforesaid in the vertical direction. When the color space distance of the average ABC and average DEF is greater than a certain constant K1 times the sum of the color space distance between AD, BE, CF, the change in pixel value of AD, BE, CF is guaranteed to be directionally similar.

For example, if the change in pixel value of AD and the change in pixel value of BE have the same magnitude in the completely opposite direction in the color space, the color space distance of the average ABC and average CEF matches the color space distance between CF even if the sum of the color space distance AD, BE, CF is large. This is a small color space distance compared to when the change in pixel value AD, BE are completely identical in magnitude and direction.

Similarly, the presence of an edge between DEF and GHI is determined, and if an edge is present in either one, area E is determined to be an edge in the horizontal direction. An edge in the vertical direction is similarly determined relative to ADG, BEH, CFI.

As previously described, smoothing in the direction of the edge is executed only when it is determined that at edge is present in only the vertical direction or the horizontal direction. Smoothing in the vertical direction relative to a pixel determined to be an edge pixel in the vertical direction is accomplished using a general smoothing filter such as the example shown in FIG. 36*a*.

Figures 36A, 36B, 37A, 37B, 38:
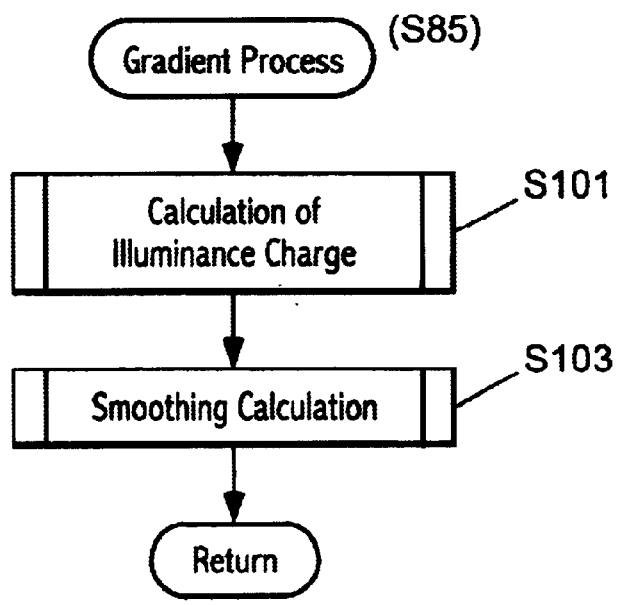
FIG. 38 is a flow chart showing the content of the gradient process (S85) of FIG. 30.

Smoothing is similarly accomplished in the horizontal direction using a general smoothing filter such as the example shown in FIG. 36*b*.

As previously described, it is undesirable to perform edge adjustment in photographic regions compared to line image regions.

Therefore, the constant K1 and the threshold values THe1 and THe2 used for edge determination are increased to reduce the number of pixels subjected to edge adjustment, and the smoothing filter is changed to the filters shown in FIGS. 37*a* and 37B so as to reduce the degree of edge adjustment in the photographic region.

FIG. 38 is a flow chart showing the content of the gradient process (S85) of FIG. 30. In step S101, the change in luminance of the pixel is calculated, and in step S103 smoothing calculation is performed.

In the gradient process, appropriate smoothing is executed by changing the degree of smoothing in accordance with the degree of edge and amount of high frequency component. The amount of high frequency component may use the sum of the DCT AC component, and the edge degree may use the output value of a secondary micro filter. Smoothing is accomplished using the general smoothing filter shown in FIG. 39. Appropriate smoothing is accomplished by changing the value X at the center of the filter proportionally to the amount of high frequency component and the edge degree for each block. Similar to the edge region, it is often undesirable to perform gradient processing in the photographic region compared to the line image region. Accordingly, the filter center value X is set large in the photographic region compared to the line image region.

Figures 39, 40:
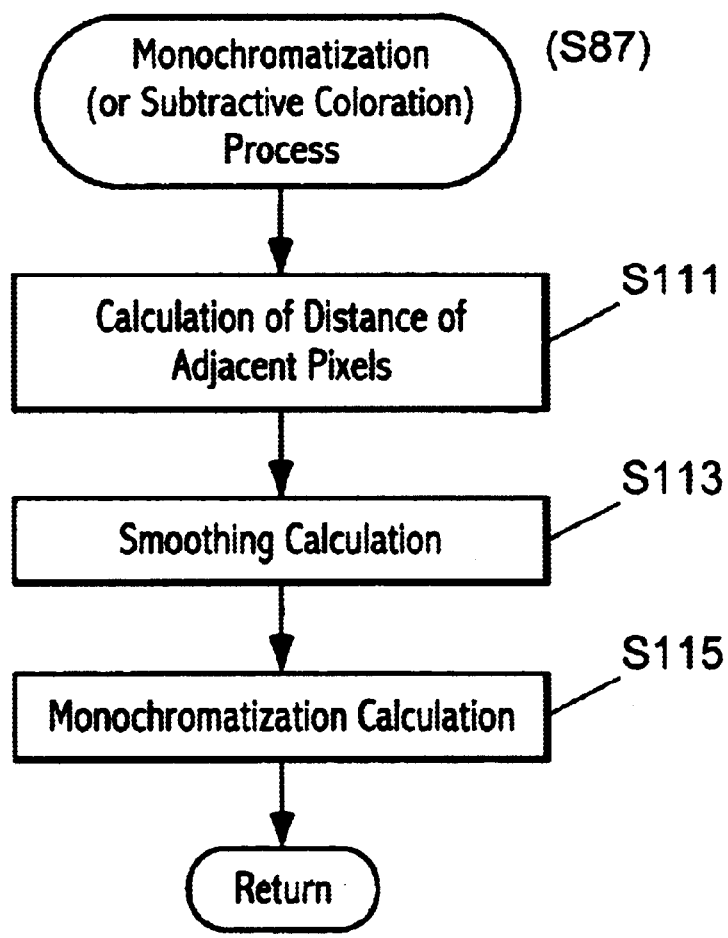
FIG. 39 shows a filter used in the gradient process.
FIG. 40 is a flow chart showing the content of the monochromatization (or subtractive coloration) process (S87) of FIG. 30.

FIG. 40 is a flow chart showing the content of the 44 monochrome (or subtractive color) process (S87) of FIG. 30. In step S111, the color space distance of adjacent pixels is calculated. In step S113, the smoothing calculation is performed, and in step S115 monochromatization (or subtractive coloration) is calculated.

A monochrome area included in a line image region is considered a solid painted area in a document. Accordingly, the monochromatization process is executed since the interior of this monochrome area is thought to be all the same color.

Figure 41:
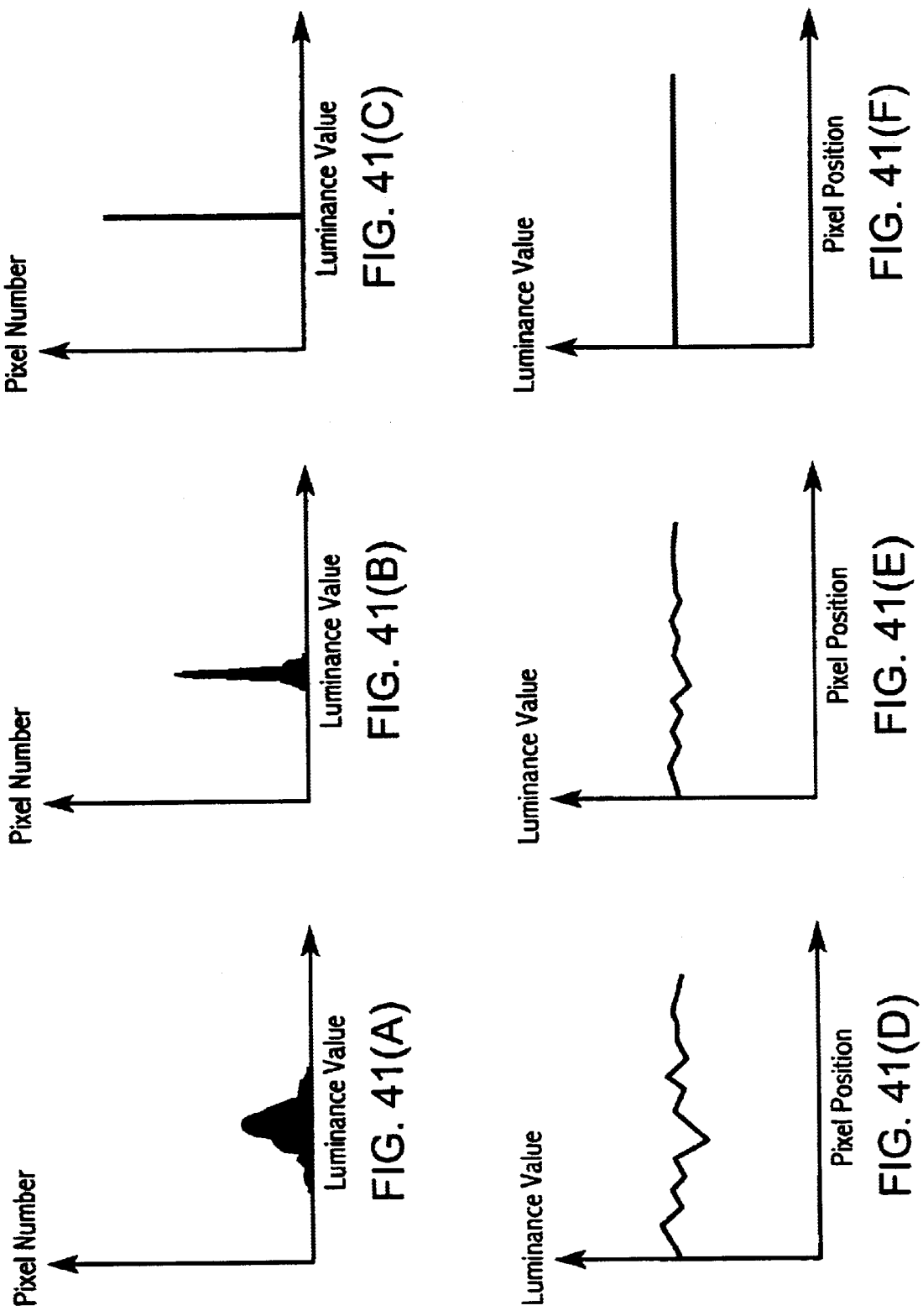
FIGS. 41(A) through (F) show an example of the monochromatization (or subtractive coloration) process.

FIG. 41 illustrates the monochromatization process (or subtractive coloration process). FIG. 41C shows a histogram after monochromatization of the monochrome area having the histogram distribution of FIG. 41A. FIG. 41F shows the luminance value of the pixel of FIG. 41D after the monochromatization process.

In FIGS. 41A through 41C, the luminance value of the pixel is shown on the horizontal axis, and the number of pixels having this luminance value is shown on the vertical axis. In FIGS. 41D through 41F, the pixel position is shown on the horizontal axis, and the luminance value of this pixel is shown on the vertical axis. The pixel position represents, for example, a unidimensional component within a particular image region.

A monochrome area included in a photographic region may be considered a region having a slight change in pixel value in a gradient image such as a photograph, and it is desirable that the processing stop at the subtractive coloration without monochromatization. That is, the histogram distribution shown in FIG. 41A is subjected to subtractive coloration to produce the histogram distribution shown in FIG. 41B. Similarly, the pixel distribution shown in FIG. 41D is subjected to subtractive coloration to produce the distribution shown in FIG. 41E.

In many of the current compression methods of JPEG, PNG and the like, the monochromatization area having completely uniform pixel values has a high compression rate. The compression rate can be greatly improved by forcing uniformity of the change in pixel values thought to be noise caused during input or printing.

A monochrome area is detected by integrating pixels having small change in pixel values between adjacent pixels, and monochromatization is executed by substituting an average pixel value for all pixel values within the area. Subtractive coloration can be accomplished by reducing the number of bits via smoothing of the pixel density.

As described above, monochromatization may be performed on a line image region, and only subtractive coloration may be performed on a photographic region, using the method of difference in the coloration process for line image regions and photographic regions, but the degree of subtractive coloration may be changed by changing the single color extraction threshold values, smoothing degree, and reducing the number of bits in the line image region and photographic region, respectively.

Integration (S21) and Output (S23)

The images of each region that are compressed by optimum compression are integrated, and output as a single file.

Figure 42:
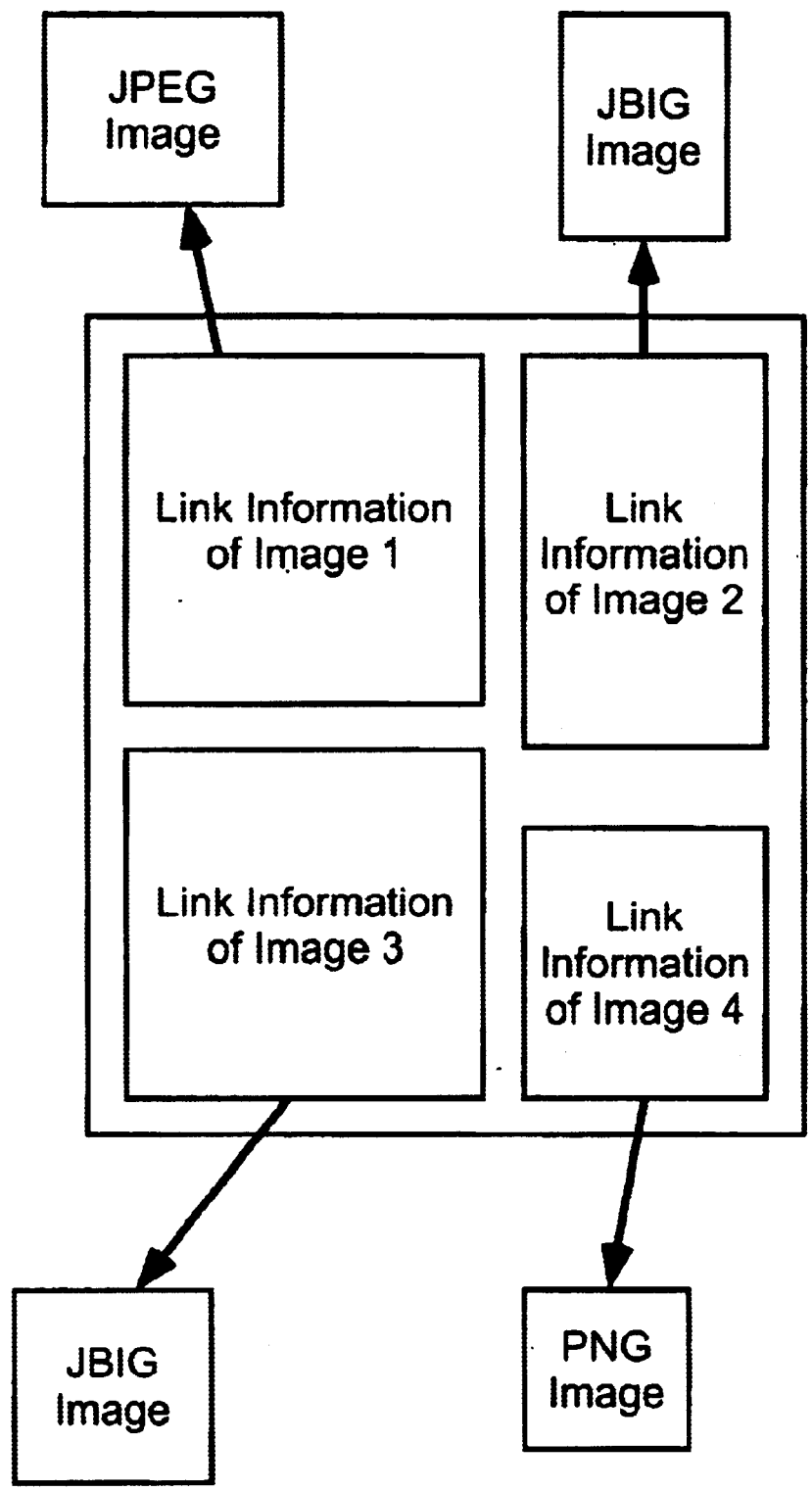
FIG. 42 illustrates a method for integrating images.

FIG. 42 shows the state of integration. Examples of integration include current methods such as PDF and HTML.

Figure 43:
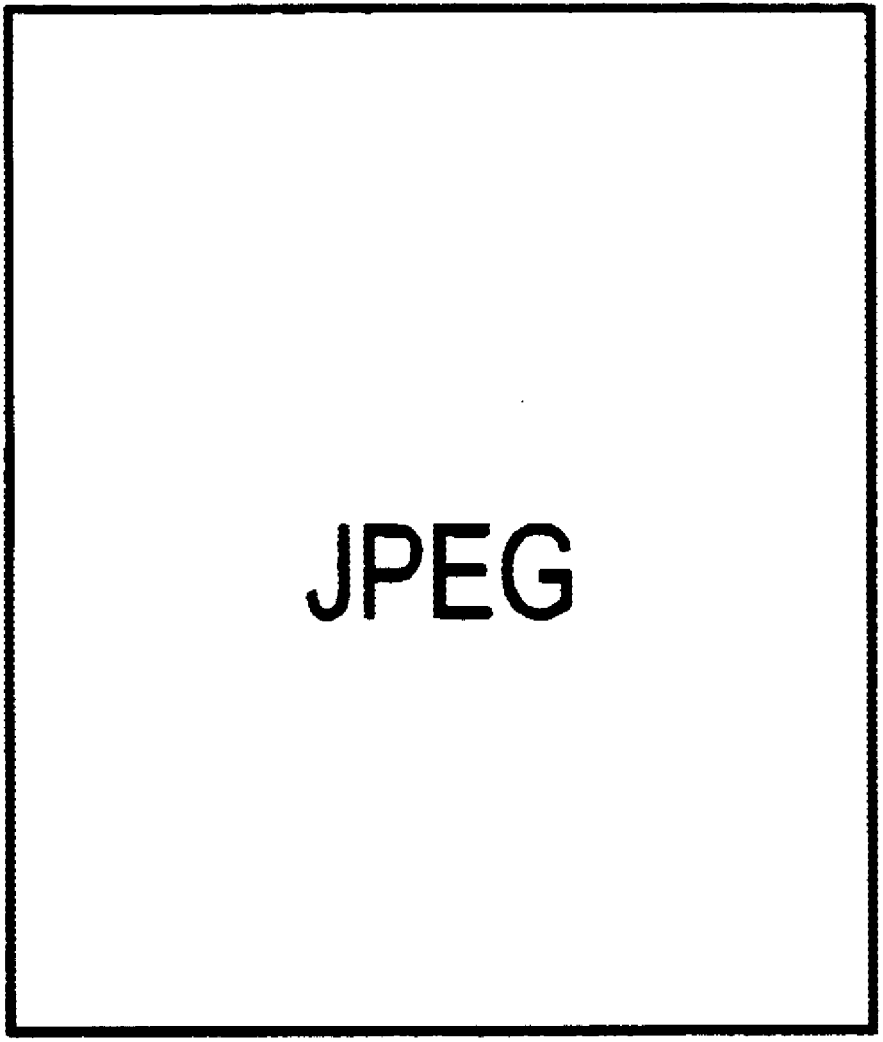
FIG. 43 shows image data output in background mode.

The example in FIG. 42 shows the integration of images 1 through 4, and the link information of the respective images 1 through 4 is stored in memory. The information of image 1 is stored as a JPEG image, the information of image 2 is stored as a JBIG image, the information of image 3 is stored as a JBIG image, and the information of image 4 is stored as a PNG image. When the document correction specification switch 7 is turned OFF, generally used noise elimination, smoothing, acumination, and color correction are performed on the image data, and after the image data are compressed by a common compression method such as JPEG, storage output and transmission may occur (FIG. 43).

Current compression methods are extremely plentiful, and there are many different types of images that can be compressed with efficiency and high image quality using these methods. Accordingly, attribute discrimination of the macro regions which are square regions in units of compression are not limited to only line image region photographic region, but may include text region.

For example, a line image region may be separated into a plurality of regions for detection. Discrimination of completely different regions may be accomplished, e.g., region discrimination in accordance with the type of printed matter.

Figure 44:
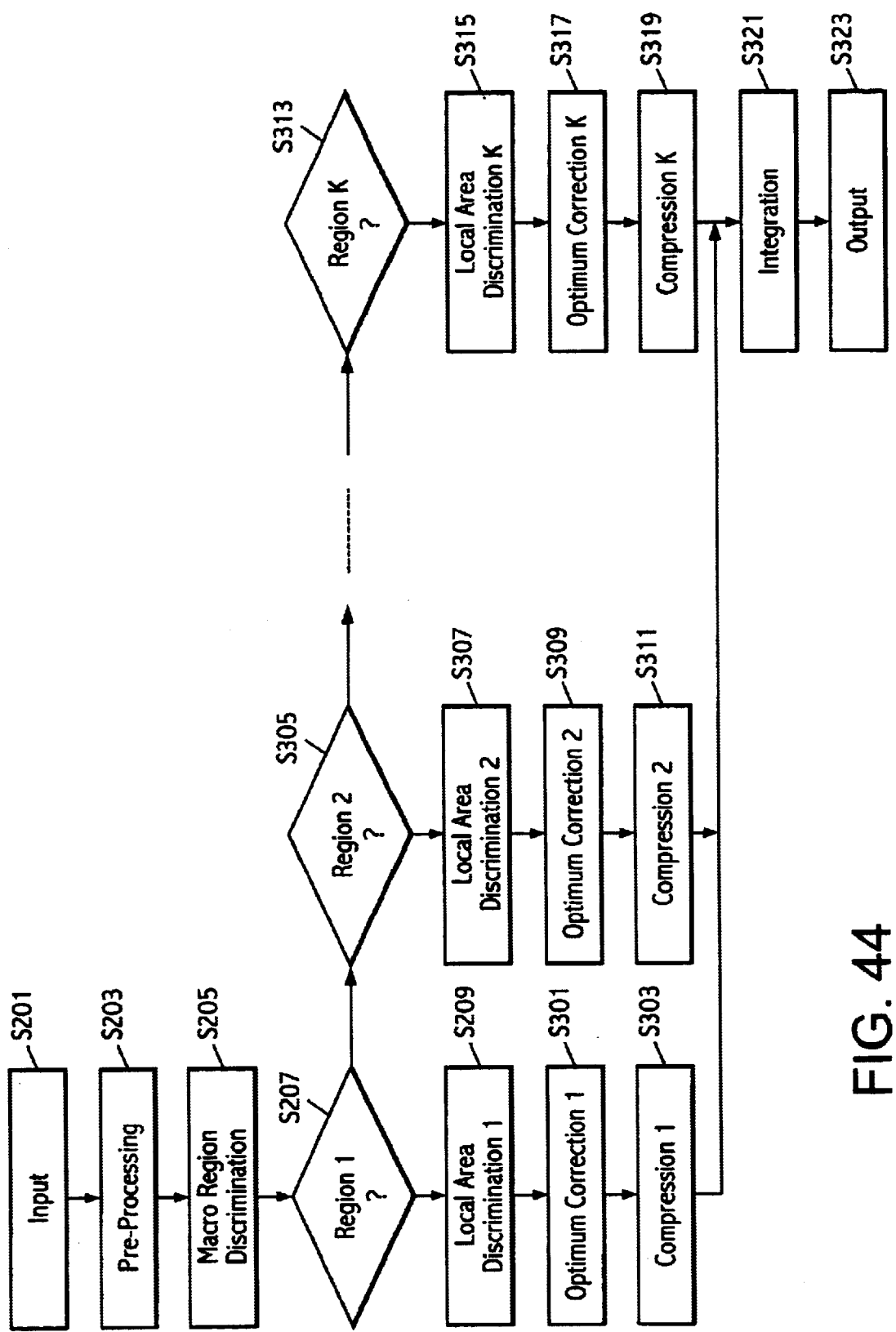
FIG. 44 is a flow chart showing a modification of the first embodiment.

In this instance, the flow chart shown in FIG. 44 can be substituted for the flow chart of FIG. 5. In the example of FIG. 5 a document is divided into three types of macro regions (S7), but in the example of FIG. 44 macro regions are divided into types 1 through K, and in each respective type of macro region local areas are discriminated, and correction and compression appropriate for the respective macro region and local area are accomplished.

Second Embodiment

The external view of the digital camera of the second embodiment is identical to that shown in FIGS. 2 and 3.

Figure 45:
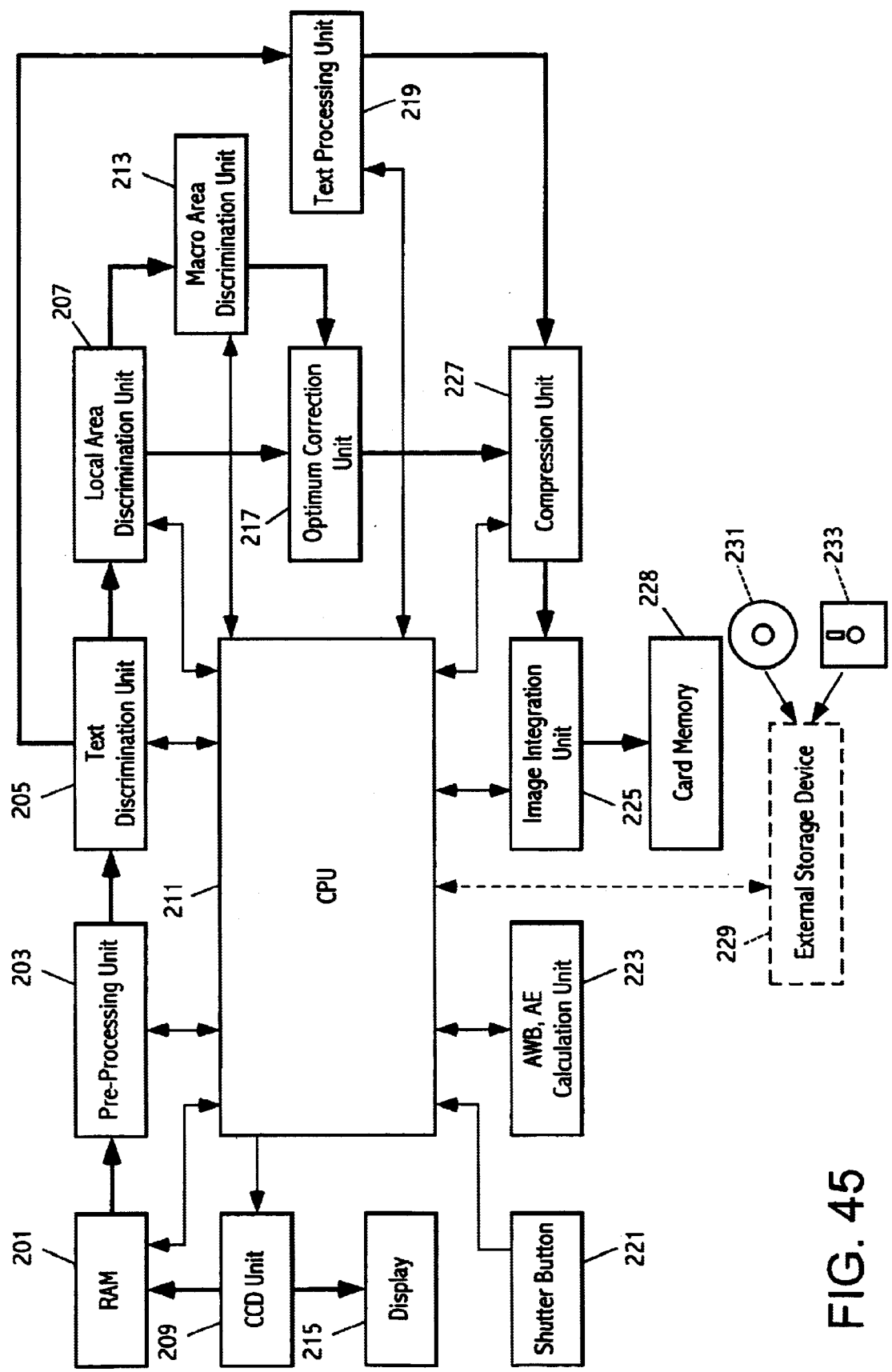
FIG. 45 is a block diagram showing the hardware construction of a digital camera of a second embodiment.

FIG. 45 is a block diagram showing the circuit construction of the digital camera of the second embodiment of the present invention. Referring to the drawing, the digital camera comprises a CPU 211, a CCD unit 209 for photoelectric conversion of light from a photographic subject, a RAM 201 for temporarily storing image data from the CCD unit 209, a preprocessing unit 203 for preprocessing of image data, a text discrimination unit 205 for discriminating a text region from among preprocessed image data, a local area discrimination unit 207 for discriminating local areas among image data after text discrimination, a macro region discrimination unit 213 for discriminating macro regions among image data after local area discrimination, an optimum correction unit 217, a text processing unit 219 for processing text data, a compression unit 227 for compressing an image, an image integration unit 225 for integrating and outputting compressed images, a card memory 229 for storing compressed image data, a calculator 223 of the AWB or AE type for various photographic calculations, a shutter button 221, and a display unit 215 for displaying image data.

The digital camera may be connected to an external memory device 229 to allow the CPU 211 to read programs for executing the following flow chart from a CD-ROM 231 or floppy disk 233.

Compared to the digital camera of the first embodiment, the digital camera of the present embodiment executes macro region discrimination after executing local area discrimination. In this way, the local area discrimination result can be used for macro region discrimination.

Specifically, the flow of the processing executed by the digital camera of the present embodiment is described below when the document correction specification switch 7 is turned ON.

Figure 46:
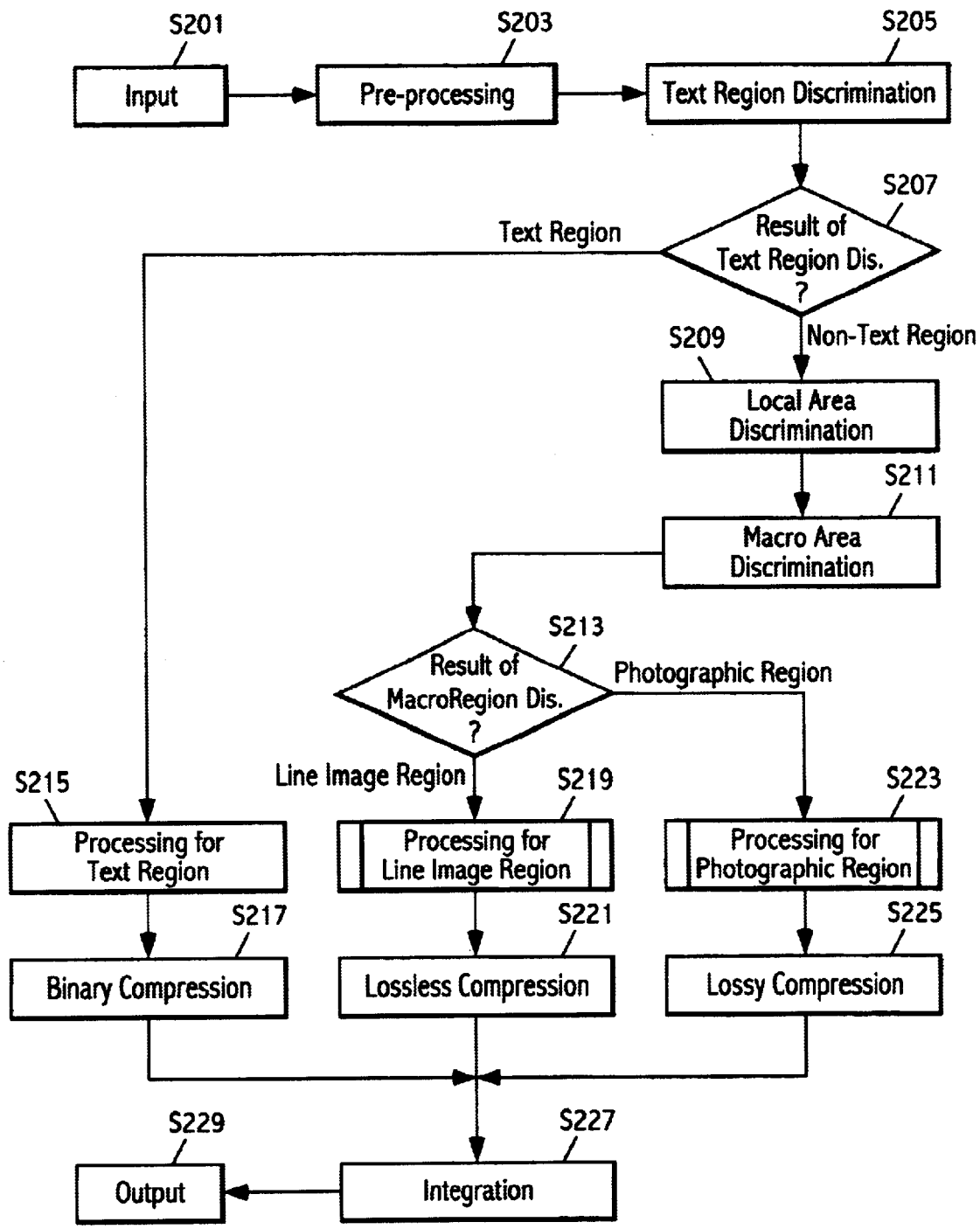
FIG. 46 is a flow chart of the processing of the second embodiment.

FIG. 46 is a flow chart showing the processing flow when the document correction specification switch 7 is turned ON. The input image data (S201) are preprocessed (S203), then the text region is discriminated (S205). The text region is subjected to resolution conversion, text correction, binarization and like processing (S215), then binary compression is performed (S217).

Furthermore, the data of the text region may be converted to character code by executing an OCR process on the text region.

Local area discrimination is performed on non-text regions to determine the attributes of each pixel and local area (S209). Macro region discrimination is performed using the results of the local area discrimination (S211).

There is a high possibility that a macro region containing many monochrome areas and edge areas as local areas may be a line image region. In contrast, there is a high possibility that a macro region containing many gradient areas as local areas may be a photographic region. Using these characteristics, the line image regions and photographic regions are determined in macro region discrimination based on the attributes of the local areas.

Referring to FIGS. 17 and 18, photographic regions contain many gradient areas, and line image regions contain many monochrome areas and edge areas.

Although in the first embodiment the photographic regions and line image regions were distinguished based on the Max-min hue value which produced many large blocks in photographic regions and many small blocks in line image regions, in the second embodiment macro regions including local areas discriminated as monochrome areas or edge areas via local area discrimination by the percentage above a certain threshold value are determined to be line image regions, and other macro regions are determined to be photographic regions.

Again referring to FIG. 46, optimum correction is performed in accordance with the local area discrimination result and the macro region discrimination result. In FIG. 46, the line image region process (S219), and photographic region process (S223) perform optimum correction corresponding to each region. Lossless compression is performed on the line image region (S221), and Lossy compression is performed on the photographic region (S225).

Figure 47:
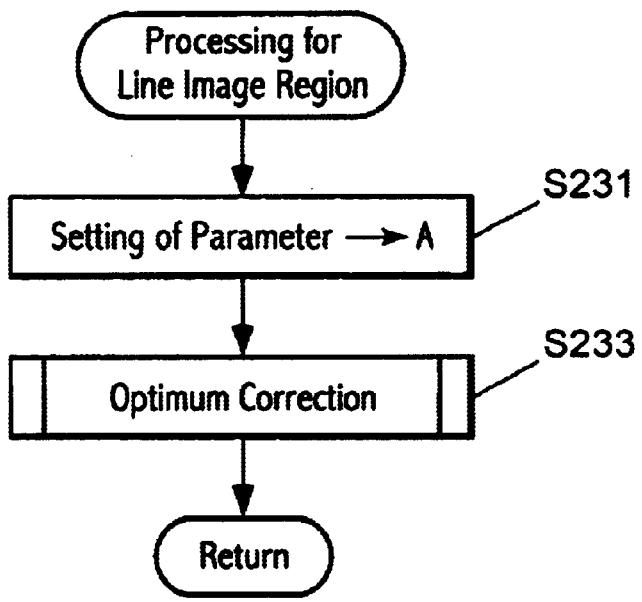
FIG. 47 is a flow chart showing the content of the line image region process (S219) of FIG. 46.
Figure 48:
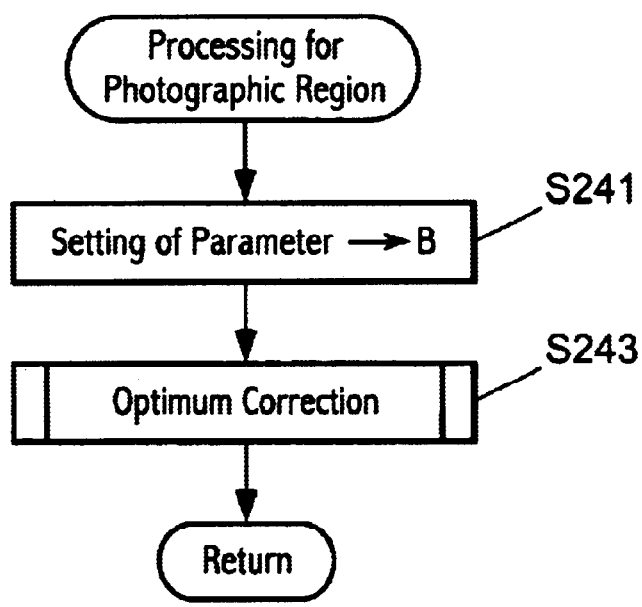
FIG. 48 is a flow chart showing the content of the photographic region process (S223) of FIG. 46.

FIG. 47 is a flow chart showing the content of the line image region process (S219) of FIG. 46, and FIG. 48 is a flow chart showing the content of the photographic region process (S223) of FIG. 46. The parameter setting A and parameter setting B of FIGS. 47 and 48 are settings comprising a collection of parameters relating to optimum correction used for line image regions and photographic regions, respectively.

In contrast to the parameter setting B, the parameter setting A is set to increase the degree of monochromatization and the degree of edge adjustment. Specifically, compared to parameter setting B, in parameter setting A the same process is executed as in the first embodiment using a large filter for the degree of smoothness.

Current compression methods are extremely plentiful, and there are also many different types of images which produce different compression efficiencies and compressed image quality in conjunction with the compression methods.

Accordingly, the subject of attribute discrimination of a macro region forming a compression unit is not limited to a line image region, photographic region, or text region. For example, a line image region may be divided into a plurality of regions, or subjected to completely separate discrimination (e.g., region discrimination in accordance with the type of printed material). In this instance, the process of FIG. 49 may be substituted for the process of FIG. 46.

Figure 49:
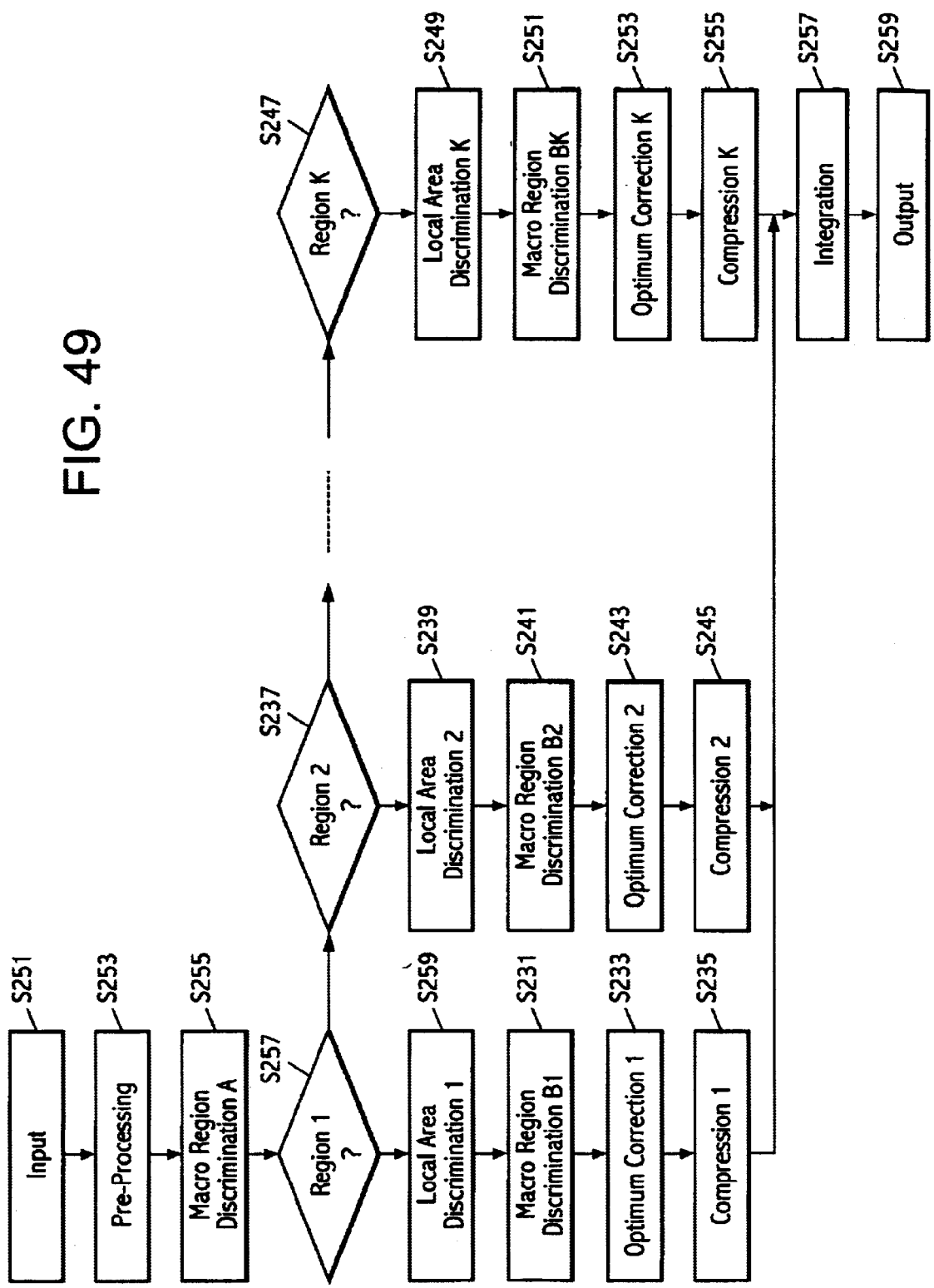
FIG. 49 is a flow chart showing a modification of the second embodiment.

Referring to FIG. 49, input image data (S251) are subjected to preprocessing (S253), then the form of the macro region is determined (S255). At this time, the local areas within each discriminated region 1 through K are discriminated (S259, S239, S249), and the attributes of the macro region are discriminated based on these results (S231, S241, S251). Thereafter, optimum correction corresponding to each macro region and local area is performed (S233, S243, S253), and each macro region is compressed (S235, S245, S255). Thereafter, the compressed image data are integrated (S257) and output (S259).

In the present embodiment, the programs described in the flow charts may be stored on CD-ROM M131, 231, or floppy disk 133, 233, so as to be executed by the CPU 111, 211 via the external storage device 129, 229.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. An image processing device comprising:

first means for determining characteristics of local areas in an input image;

second means for determining characteristics of a region for image compression containing the local areas using a determination result of the first determining means;

means for accomplishing optimum correction of the local areas based on the characteristics of the local areas determined by the first determining means; and means for selecting a compression method and compressing data based on the characteristics determined by the second determining means.

2. An image processing method comprising the steps of:

(a) determining characteristics of local areas in an input image;

(b) determining characteristics of a region for image compression containing the local areas using a determination result of step (a);

(c) obtaining optimum correction of one of the local areas based on attributes of the local area; and (d) selecting a compression method and compressing data based on the characteristics determined by step (b).

3. A processing program product to be executed by a computer, the program comprising:

(a) means for determining characteristics of local areas in an input image;

(b) means for determining characteristics of a region for image compression containing the local areas using the determination result of the determining means defined in paragraph (a);

(c) means for obtaining optimum correction of one of the local areas based on the characteristics of the local area; and (d) means for selecting a compression method and compressing data based on the characteristics determined by the determination means of paragraph (b).

* * * * *

UNITED STATES PATENT AND TRADEMARK OFFICE
CERTIFICATE OF CORRECTION

PATENT NO. : 6,735,341 B1
DATED : May 11, 2004
INVENTOR(S) : Daisaku Horie

It is certified that error appears in the above-identified patent and that said Letters Patent is hereby corrected as shown below:

Title page,
Item [75], Inventors, please delete the following:
"**Manji Takano
Kentaro Iida
Kimiharu Akahoshi**"

Signed and Sealed this

Fifteenth Day of March, 2005

JON W. DUDAS
*Director of the United States Patent and Trademark Office*